(12) United States Patent
Wright et al.

(10) Patent No.: US 10,373,503 B2
(45) Date of Patent: Aug. 6, 2019

(54) TRAINABLE TRANSCEIVER WITH SINGLE CAMERA PARK ASSIST

(71) Applicant: Gentex Corporation, Zeeland, MI (US)

(72) Inventors: Thomas S. Wright, Holland, MI (US); Steven L. Geerlings, Holland, MI (US); David M. Bostrom, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 23 days.

(21) Appl. No.: 14/991,446

(22) Filed: Jan. 8, 2016

(65) Prior Publication Data

US 2016/0203721 A1    Jul. 14, 2016

Related U.S. Application Data

(60) Provisional application No. 62/101,740, filed on Jan. 9, 2015.

(51) Int. Cl.
*G08G 1/16* (2006.01)
*B60R 1/00* (2006.01)
(Continued)

(52) U.S. Cl.
CPC ............ *G08G 1/168* (2013.01); *B60R 1/00* (2013.01); *B62D 15/027* (2013.01); *G08G 1/163* (2013.01); *H04N 7/18* (2013.01); *H04N 7/183* (2013.01)

(58) Field of Classification Search
CPC .................. H04N 7/18; G08G 1/168
See application file for complete search history.

(56) References Cited

U.S. PATENT DOCUMENTS 9,902,323 B2 *    2/2018   Watanabe ............... B60R 1/002
2006/0271278 A1*  11/2006  Sakakibara ........ B62D 15/0275
                                                        701/523
(Continued)

FOREIGN PATENT DOCUMENTS

CN       104266654 A      1/2015
EP       1 783 035 A1     5/2007
(Continued)

OTHER PUBLICATIONS

Written Opinion of the International Searching Authority in corresponding International Application No. PCT/US2016/012679 dated Jul. 14, 2016, 8 pages.
(Continued)

*Primary Examiner* — William C Vaughn, Jr.
*Assistant Examiner* — Jerry T Jean Baptiste
(74) *Attorney, Agent, or Firm* — Foley & Lardner LLP; Bradley D. Johnson

(57) ABSTRACT

A trainable transceiver for controlling a device and providing vehicle position information to a vehicle occupant includes a transceiver circuit, an output device, and a control circuit coupled to the transceiver circuit and the output device. The control circuit is configured to receive, using the transceiver circuit or a secondary transceiver, image data corresponding to a position of the vehicle. The control circuit is further configured to determine a vehicle position status based on the image data and to control the output device to convey information to the vehicle occupant based on the vehicle position status.

12 Claims, 7 Drawing Sheets

(51) Int. Cl.
*H04N 7/18* (2006.01)
*B62D 15/02* (2006.01)

(56) References Cited

U.S. PATENT DOCUMENTS

| | | | | |
|---|---|---|---|---|
| 2010/0171588 | A1* | 7/2010 | Chutorash | G07C 9/00182 340/5.71 |
| 2013/0335561 | A1* | 12/2013 | Kourogi | B60R 21/0134 348/140 |
| 2016/0288833 | A1* | 10/2016 | Heimberger | B62D 15/027 |

FOREIGN PATENT DOCUMENTS

| | | |
|---|---|---|
| EP | 1 783 035 A1 | 5/2007 |
| EP | 2 528 050 A1 | 11/2012 |
| EP | 2 528 050 A1 | 11/2012 |
| JP | 2007-161119 A | 6/2007 |
| JP | 2007 161119 A | 6/2007 |
| JP | 2009-111536 A | 5/2009 |
| JP | 2009 111536 A | 5/2009 |
| WO | WO-2009/150086 A1 | 12/2009 |
| WO | WO-2012/103408 A1 | 8/2012 |

OTHER PUBLICATIONS

International Preliminary Report on Patentability and Transmittal dated Jul. 20, 2017 in corresponding International Application No. PCT/US2016/012679, 7 pages.
Supplementary European Search Report received in corresponding European application No. 16735487.7 dated Nov. 24, 2017, 9 pages.
European Patent Office, Extended European Search Report, G5421EU, 16735487.7-1755 /3243194, PCT/US2016012679, dated Nov. 24, 2017, 9 pages.
English translation of First Office Action dated Jun. 4, 2019, for corresponding Chinese application No. 2016800107491, 11 pages.
First Office Action dated Jun. 4, 2019, for corresponding Chinese application No. 2016800107491, 8 pages.

* cited by examiner

TRAINABLE TRANSCEIVER WITH SINGLE CAMERA PARK ASSIST

CROSS-REFERENCE TO RELATED APPLICATIONS

This application claims the benefit of and to U.S. Provisional Application No. 62/101,740, filed Jan. 9, 2015, which is hereby incorporated by reference in its entirety.

FIELD

The present invention relates generally to the field of trainable transceivers for inclusion within a vehicle, and more particularly to a trainable transceiver for controlling a device and providing vehicle position information to a vehicle occupant, and methods thereof.

BACKGROUND

A trainable transceiver generally sends and/or receives wireless signals using a transmitter, receiver, and/or transceiver (e.g., using radio frequency transmissions). The wireless signals may be used to control other devices. For example, a trainable transceiver may send a wireless control signal to operate a garage door opener. A trainable transceiver may be trained to operate with a particular device. Training may include providing the trainable transceiver with control information for use in generating a control signal. Training may include enrolling the trainable transceiver with a device. A trainable transceiver may be incorporated in a vehicle (integrally or contained within the vehicle) and used to control devices outside the vehicle. It is challenging and difficult to develop a park assist system with a single camera in communication with a trainable transceiver, the trainable transceiver providing park assist information to a vehicle driver. It is further challenging and difficult to develop an easy way of training a parking assist system.

SUMMARY

One embodiment of the invention relates to a trainable transceiver for controlling a device and providing vehicle position information to a vehicle occupant. The trainable transceiver includes a transceiver circuit, an output device, and a control circuit coupled to the transceiver circuit and the output device. The control circuit is configured to receive, using the transceiver circuit or a secondary transceiver, image data corresponding to a position of the vehicle. The control circuit is further configured to determine a vehicle position status based on the image data and to control the output device to convey information to the vehicle occupant based on the vehicle position status.

Another embodiment relates to a trainable transceiver for controlling a device and providing vehicle position information to a vehicle occupant. The trainable transceiver includes a transceiver circuit, an output device, and a control circuit coupled to the transceiver circuit and the output device. The control circuit is configured to receive, using the transceiver circuit or a secondary transceiver, a vehicle position status determined by a remote device based on image data corresponding to a position of the vehicle. The control circuit is further configured to control the output device to convey information to the vehicle occupant based on the vehicle position status.

Another embodiment relates to a method of providing vehicle position information to a vehicle occupant using a trainable transceiver. The method includes establishing, using a transceiver circuit or a secondary transceiver of the trainable transceiver, communication between the trainable transceiver and a remote device. The method includes receiving image data, at the trainable transceiver, wherein the image data corresponds to a position of the vehicle. The method includes determination, using a control circuit of the trainable transceiver, a vehicle position status based on the received image data. The method includes providing, using an output device of the trainable transceiver, vehicle position information based on the determined vehicle position status.

Another embodiment relates to a method of providing vehicle position information to a vehicle occupant using a trainable transceiver. The method includes establishing, using a transceiver circuit or a secondary transceiver of the trainable transceiver, communication between the trainable transceiver and a remote device. The method includes receiving image data, at the remote device, wherein the image data corresponds to a position of the vehicle. The method includes determining, using the remote device, a vehicle position status based on the received image data. The method includes receiving, using the transceiver circuit or the secondary transceiver of the trainable transceiver, the vehicle position status from the remote device. The method includes providing, using an output device of the trainable transceiver, vehicle position information based on the received vehicle position status.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
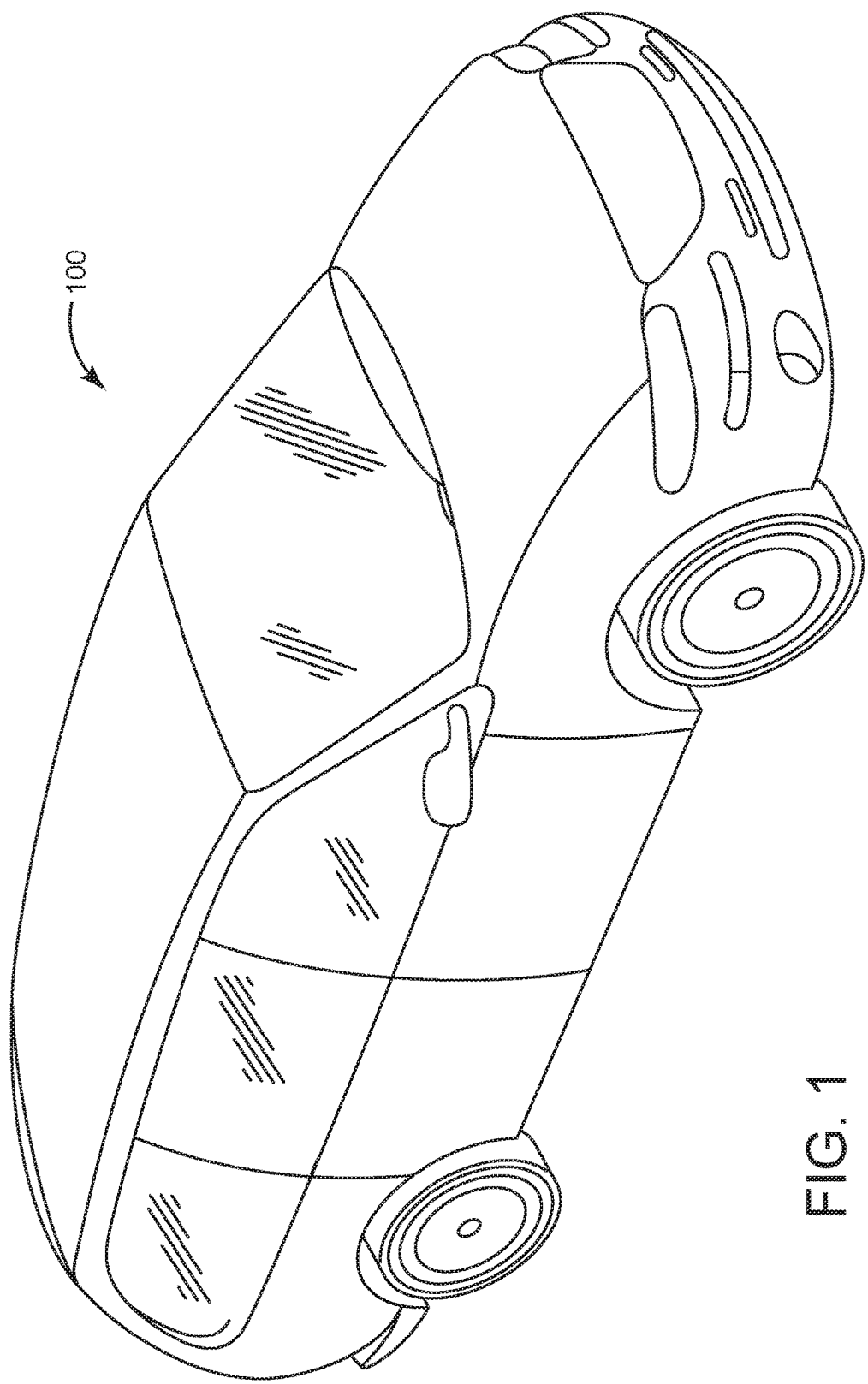
FIG. 1 illustrates a vehicle having a trainable transceiver, according to an exemplary embodiment.

Generally, a trainable transceiver controls one or more home electronic devices and/or remote devices. For example, the trainable transceiver may be a Homelink trainable transceiver. The trainable transceiver sends activation and/or control signals to home electronic devices and/or remote devices in order to control or otherwise communicate with the devices. As described herein, a trainable transceiver according to some embodiments provides information to a vehicle occupant regarding the positioning of the vehicle within a garage or other structure. Advantageously, this may aid the vehicle operator in positioning the vehicle in the garage or structure such that obstacles are avoided, a barrier may close, and/or the vehicle is otherwise well positioned. The trainable transceiver may provide information using an output device. The position of the vehicle, status of the vehicle, and/or if the vehicle is well positioned may be determined based on one or more images of the vehicle provided to the trainable transceiver by a single camera and/or home electronics device. In some embodiments, image(s) are analyzed by the trainable transceiver to determine the position of the vehicle. In other embodiments, image(s) are analyzed by a home electronics device. Following a general discussion of trainable transceivers, this and other embodiments of the trainable transceiver capable of directing transmissions are described with reference to the FIGURES.

With respect to trainable transceivers for controlling home electronics device and/or remote devices in general, home electronic devices may include devices such as a garage door opener, gate opener, lights, security system, and/or other device which is configured to receive activation signals and/or control signals. A home electronic device need not be associated with a residence but can also include devices associated with businesses, government buildings or locations, or other fixed locations. Remote devices may include mobile computing devices such as mobile phones, smartphones, tablets, laptops, computing hardware in other vehicles, and/or other devices configured to receive activation signals and/or control signals.

Activation signals may be wired or, preferably, wireless signals transmitted to a home electronic device and/or remote device. Activation signals may include control signals, control data, encryption information (e.g., a rolling code, rolling code seed, look-a-head codes, secret key, fixed code, or other information related to an encryption technique), or other information transmitted to a home electronic device and/or remote device. Activation signals may have parameters such as frequency or frequencies of transmission (e.g., channels), encryption information (e.g., a rolling code, fixed code, or other information related to an encryption technique), identification information (e.g., a serial number, make, model or other information identifying a home electronic device, remote device, and/or other device), and/or other information related to formatting an activation signal to control a particular home electronic device and/or remote device.

In some embodiments, the trainable transceiver receives information from one or more home electronic devices and/or remote devices. The trainable transceiver may receive information using the same transceiver used to send activation signals and/or other information to home electronic devices and/or remote devices. The same wireless transmission scheme, protocol, and/or hardware may be used for transmitting and receiving. The trainable transceiver may have two way communication with home electronic devices and/or remote devices. In other embodiments, the trainable transceiver includes additional hardware for two way communication with devices and/or receiving information from devices. In some embodiments, the trainable transceiver has only one way communication with a home electronic device. The trainable transceiver may receive information about the home electronic device from a remote device in a separate communication. The information about the home electronic device and/or remote device may be received from an intermediary device such as an additional remote device and/or mobile communication device.

A trainable transceiver may also receive information from and/or transmit information to other devices configured to communicate with the trainable transceiver. For example, a trainable transceiver may receive information from cameras (e.g., imaging information may be received) and/or other sensors. The cameras and/or other sensors may communicate with a trainable transceiver wirelessly (e.g., using one or more transceivers) or through a wired connection. In some embodiments, a trainable transceiver may communicate with mobile communications devices (e.g., cell phones, tablets, smartphones, or other communication devices). In some embodiments, mobile communications devices may include other mobile electronics devices such as a global positioning system or other navigation devices, laptops, personal computers, and/or other devices. In still further embodiments, the trainable transceiver is configured to communicate with networking equipment such as routers, servers, switches, and/or other hardware for enabling network communication. The network may be the internet and/or a cloud architecture.

The trainable transceiver transmits and/or receives information (e.g., activation signals, control signals, control data, status information, or other information) using a radio frequency signal. For example, the transceiver may transmit and/or receive radio frequency signals in the ultra-high frequency range, typically between 260 and 960 megahertz (MHz), although other frequencies may be used. In other embodiments, a trainable transceiver may include additional hardware for transmitting and/or receiving signals (e.g., activation signals and/or signals for transmitting and/or receiving other information). For example, a trainable transceiver may include a light sensor and/or light emitting element, a microphone and/or speaker, a cellular transceiver, an infrared transceiver, or another communication device.

The trainable transceiver may be trained by a user to work with particular remote devices and/or home electronic devices (e.g., a garage door opener). For example, a user may manually input control information into the trainable transceiver to configure the trainable transceiver to control the device. A trainable transceiver may also learn control information from an original transmitter. A trainable transceiver may receive a signal containing control information from an original transmitter (e.g., a remote sold with a home electronic device) and detect the control information of the received signal. In some embodiments, an original transmitter is a transmitter produced by the manufacturer of home electronics device, remote device, or other device for use specifically with the corresponding device. For example, an original transmitter may be a transmitter which is sold separately from a home electronics device, remote device, or other device but is intended to work with that device. The original transmitter may be a transmitter or transceiver that is part of a retrofit kit to add functions to an existing home electronics device, remote device, or other device. An original transmitter may be a transmitter or transceiver that is not manufactured by or under license from the manufacturer or owner of a home electronics device, remote device, or other device.

Referring to the FIGURES generally, a trainable transceiver may provide outputs to a vehicle driver and/or occupant which aid in positioning or parking the vehicle within a garage or other structure. The trainable transceiver uses images and/or image data from one or more cameras in order to provide an output or outputs which assist in positioning the vehicle. Examples of outputs include, flashing light emitting diodes or other light sources one or more colors, providing an audible output such as a beep or tone, providing a visual output such as an image of the vehicle within the garage or structure, providing a visual image which represents a vehicle positioned within a garage, and/or other outputs. Outputs or various types may be used together in some embodiments of the trainable transceiver. Outputs may be used to provide information such as when the vehicle is well positioned in the garage or other structure, when the vehicle is well positioned in the garage or other structure such that a garage door may close, warnings when the vehicle is approaching an object or wall within the garage, an indication that the vehicle is approaching a position in which the vehicle is well positioned, and/or provide other information related to positioning the vehicle within a garage or structure.

In one embodiment, the source of images and/or image data, used to determine the position of the vehicle in the garage and/or if the vehicle is well positioned, is a single camera, such as a single overhead camera. The camera may be mounted in a garage or other structure such that the camera has a top down view of the vehicle in the garage or structure. The camera may be mounted to a home electronics device, such as by being mounted to a garage door opener so as to have a field of view below the garage door opener, in order to provide images and/or image data of the garage and a vehicle to be positioned in the garage below the garage door opener. In an alternative embodiment, the single camera may be mounted on the vehicle. The single camera may be a web enabled camera, smart camera (e.g., a camera including both imaging hardware and image processing hardware and/or software), or other type of camera which communicates wirelessly with the trainable transceiver. For example, Bluetooth protocols, internet protocols (e.g., transmission control protocol, internet protocol, and/or other protocols), WiFi protocols, and/or other techniques may be used for communication between a transceiver of the camera and a transceiver of the trainable transceiver. In further embodiments, multiple cameras may be in communication with the trainable transceiver to communicate images and/or image data.

In other embodiments, the source of images and/or image data, used to determine the position of the vehicle in the garage and/or if the vehicle is well positioned, is a home electronics device including a single camera. For example, a garage door opener may include a single camera with a top down view of the garage/structure and/or a vehicle therein. The camera may be mounted to the garage door opener or mounted to the ceiling and connected to the garage door opener using a wired or wireless (e.g., Bluetooth, WiFi, or other wireless transmission protocol and transceiver) connection. The home electronics device may be in communication (e.g., bidirectional communication) with the trainable transceiver using transceiver and transceiver circuit of the trainable transceiver. These may be the same components which are used in controlling the home electronics device with the trainable transceiver. Advantageously, this allows the trainable transceiver to provide parking assistance (e.g., positioning alerts, an indication of the vehicle being well positioned, collision warnings, images of the vehicle in the garage, etc.) without additional or dangerous components or equipment. For example, parking assistance to a driver of the vehicle may be provided using a trainable transceiver, which may already be located in the vehicle, rather than with additional dangerous equipment (e.g., systems using laser range finders or laser break beams, etc.) or intrusive equipment (e.g., sensors mounted to a wall or floor, a ball hanging from a ceiling, etc.). In further embodiments, multiple cameras may be in communication with the home electronics device and the trainable transceiver via the home electronics device.

In some embodiments, cameras which are separate from a home electronics device and cameras in communication with a home electronics device may be used in conjunction to provide images and/or image data used in providing parking assistance via the trainable transceiver. In further embodiments, cameras located in or on the vehicle and/or other sensors (e.g., radar range finders, ultrasound range finders, collision warning sensors, and/or other sensors) located in or on the vehicle may be used in conjunction with a camera and/or camera(s) in communication with a home electronics device. In some embodiments, a single camera mounted in or on the vehicle (e.g., a camera oriented to provide image data as the vehicle enters the garage) may provide images and/or image data.

In one embodiment, the trainable transceiver receives images and/or image data and processes the information in order to determine the position and/or well positioned status of the vehicle. The trainable transceiver may receive images and/or image data from a camera and/or home electronics device and use one or more techniques described in more detail with reference to FIG. 3 in order to determine the position and/or well positioned status of the vehicle. For example, a control circuit and/or module in memory may use image processing techniques such as pre-processing using one or more algorithms, feature extraction using one or more algorithms, image detection/segmentation using one or more algorithms, high-level processing (e.g., verification that the image data satisfies a model, estimation of application specific parameters, such as object pose or object size, image recognition such as classifying a detected object into one or more different categories, image registration such as comparing and combining two different views of the same object, etc.) using one or more algorithms, comparing two images or sets of image data, counting pixels to determine distances between objects or otherwise determining or estimating distances, and/or other techniques. These and/or other computer vision techniques, image processing techniques, machine vision techniques, or other techniques can be used to determine information about the position of the vehicle in the garage. Information may include whether the vehicle is well positioned (e.g., as determined by comparing a current image of the vehicle to a stored image of a well-positioned vehicle), the distance between the vehicle and an object (e.g., the distance between the vehicle and a wall of the garage determined by counting the number of pixels in an image between a determined vehicle object and determined wall or other object), and/or other information.

In some embodiments, the position of the vehicle is determined by comparing a current image(s) of the vehicle with a stored image(s) of the vehicle. The stored image of the vehicle is an image of the vehicle well-positioned (e.g., well-positioned with a garage, well-positioned in a structure, well positioned in designated parking spot, and/or otherwise located in an appropriate or desired location). The stored image may be provided using one or more training techniques. In some embodiments, the system learns when the vehicle is well positioned and stores one or more images of the well positioned vehicle. For example, a camera may be caused (e.g., instructed by a home electronics device or the trainable transceiver) to take and store an image of the vehicle under various lighting conditions (e.g., daytime, nighttime, vehicle headlights on, vehicle headlights off, garage window shades closed, garage window shades opened, garage lighting on, garage lighting off, and/or other lighting conditions). The trainable transceiver and/or home electronics device may cause an image to be stored based on a variety of occurrences. For example, triggers for the storage of comparison images may include when the trainable transceiver is turned off, when the vehicle engine is shut off, when movement of the vehicle is not detected for a predetermined amount of time, when communication between the trainable transceiver and home electronics device ceases, and/or when other events occur. In some embodiments, the system may be configured to store an image of a well-positioned vehicle periodically (e.g., after a vehicle is determined to be well positioned, multiple images under various lighting conditions may be stored prior to the vehicle moving again). In further embodiments, the system may be trained, or caused to store an image of a well-positioned vehicle for later comparison, by one or more actions of a user. For example, the user may be prompted to provide an input via the operator input device, flash the headlights of the vehicle on and off, or take another action which signals to the system that the vehicle is well positioned. At that time, the home electronics device, standalone camera, and/or trainable transceiver may store an image of the vehicle for later use in providing parking/positioning assistance using one or more of the techniques described herein.

Using this information and/or other information determined based on images and/or image data, the trainable transceiver may output a status indicator (e.g., well positioned, nearly well positioned, collision warning, and/or other status) to the vehicle driver and/or occupant using an output device (e.g., light, display, speaker, and/or other output device). In alternative embodiments, the trainable transceiver receives a vehicle status or instructions to output a specific status indicator. For example, a web enabled camera, smart camera, or other standalone camera in communication with the trainable transceiver may determine the position and/or well positioned status of the vehicle and transmit this information to the trainable transceiver and/or instructions to cause a specific output rather than providing the trainable transceiver with images and/or image data. The camera may process images and/or image data using one or more of the techniques described with reference to FIG. 3 in order to determine the position and/or well positioned status of the vehicle. In other embodiments, images and/or image data is processed by a home electronics device which transmits the position, well positioned status, vehicle status, instructions for providing a specific output, and/or other information to the trainable transceiver. Using the systems and/or techniques described herein, parking/positioning assistance is provided to an operator of a vehicle.

Referring now to FIG. 1, a vehicle is illustrated according to one embodiment. In some embodiments, a trainable transceiver is located within, mounted to, removably attached to, and/or otherwise associated with a vehicle. The trainable transceiver may be mounted or otherwise attached to a vehicle in a variety of locations. For example, a trainable transceiver may be integrated into a dashboard or center stack (e.g., infotainment center) of a vehicle. The trainable transceiver may be integrated into the vehicle by a vehicle manufacturer. A trainable transceiver may be located in other peripheral locations. For example, a trainable transceiver may be removably mounted to a visor. The trainable transceiver may include mounting hardware such as a clip. A trainable transceiver may be mounted to other surfaces of a vehicle (e.g., dashboard, windshield, door panel, or other vehicle component). For example, a trainable transceiver may be secured with adhesive. In some embodiments, a trainable transceiver is integrated in a rear view mirror of the vehicle. A vehicle manufacturer may include a trainable transceiver in the rear view mirror.

In other embodiments, a vehicle may be retrofit to include a trainable transceiver. This may include attaching a trainable transceiver to a vehicle surface using a clip, adhesive, or other mounting hardware as described above. Alternatively, it may include replacing a vehicle component with one that includes an integrated trainable transceiver and/or installing a vehicle component which includes an integrated trainable transceiver. For example, an aftermarket rear view mirror, vehicle camera system (e.g., one or more cameras and one or more display screens), and/or infotainment center may include an integrated trainable transceiver. In further embodiments, one or more components of a trainable transceiver may be distributed within the vehicle. For example and discussed in greater detail with respect to FIG. 3, an operator input device for receiving user input and/or providing output may be located within the vehicle remotely from the antenna and/or other components of the trainable transceiver.

In one or more of these embodiments, the trainable transceiver may be installed, removably attached, or otherwise attached to or integrated with the vehicle in a variety of locations. For example, the trainable transceiver or a portion thereof (e.g., an operator input device) may be included within a rearview mirror of the vehicle, in center console of the vehicle, in a dashboard of a vehicle, in a control console located on the headliner of a vehicle, and/or in other locations within the vehicle. In some embodiments, the trainable transceiver, or a portion thereof, is installed in a vehicle by a vehicle manufacturer or retrofitter.

Still referring to FIG. 1, the vehicle is illustrated as automobile. However, the vehicle may be any type of vehicle. The vehicle may be a car, truck, sport utility vehicle, tractor trailer, or other automobile. The vehicle may be a motorcycle or other two or three wheeled vehicle. In still further embodiments, the vehicle may be an airborne vehicle (e.g., airplane, helicopter, etc.), or waterborne vehicle (e.g., boat, personal watercraft, etc.).

In some embodiments, the vehicle may include one or more cameras. For example, the vehicle may include one or more cameras used for driver aids such as backup camera systems, anti-collision systems, blind spot warning systems, and/or other driver aids. The vehicle may further include cameras for other purposes such as dash mounted cameras for recording the roadway in front of the vehicle. The vehicle may include cameras which are installed by a vehicle manufacturer or original equipment manufacturer. The vehicle may additionally or alternatively include one or more cameras installed as aftermarket or retrofit equipment (e.g., an aftermarket backup camera). The vehicle camera(s) may be integrated with a vehicle communication system such as a controller area network (CAN) for transferring data, instructions, and/or other information between vehicle systems. In some embodiments, the trainable transceiver may access image data from one or more vehicle cameras using an interface with the vehicle communication system. For example, the trainable transceiver may include a CAN bus. Alternatively, the trainable transceiver may access image data from one or more vehicle cameras using a wired or wireless connection to the camera and/or camera system. For example, the trainable transceiver may include an additional transceiver (e.g., a Bluetooth transceiver) which communicates with an aftermarket backup camera system using wireless transceivers for communication between a camera and display. Alternatively, the trainable transceiver could be wired to a vehicle camera (e.g., a wired connection spliced to a connection from a camera to a display of the vehicle or included in the vehicle). Embodiments of the trainable transceiver which use vehicle based camera for parking assistance are further described herein with reference to FIG. 4.

Figure 2:
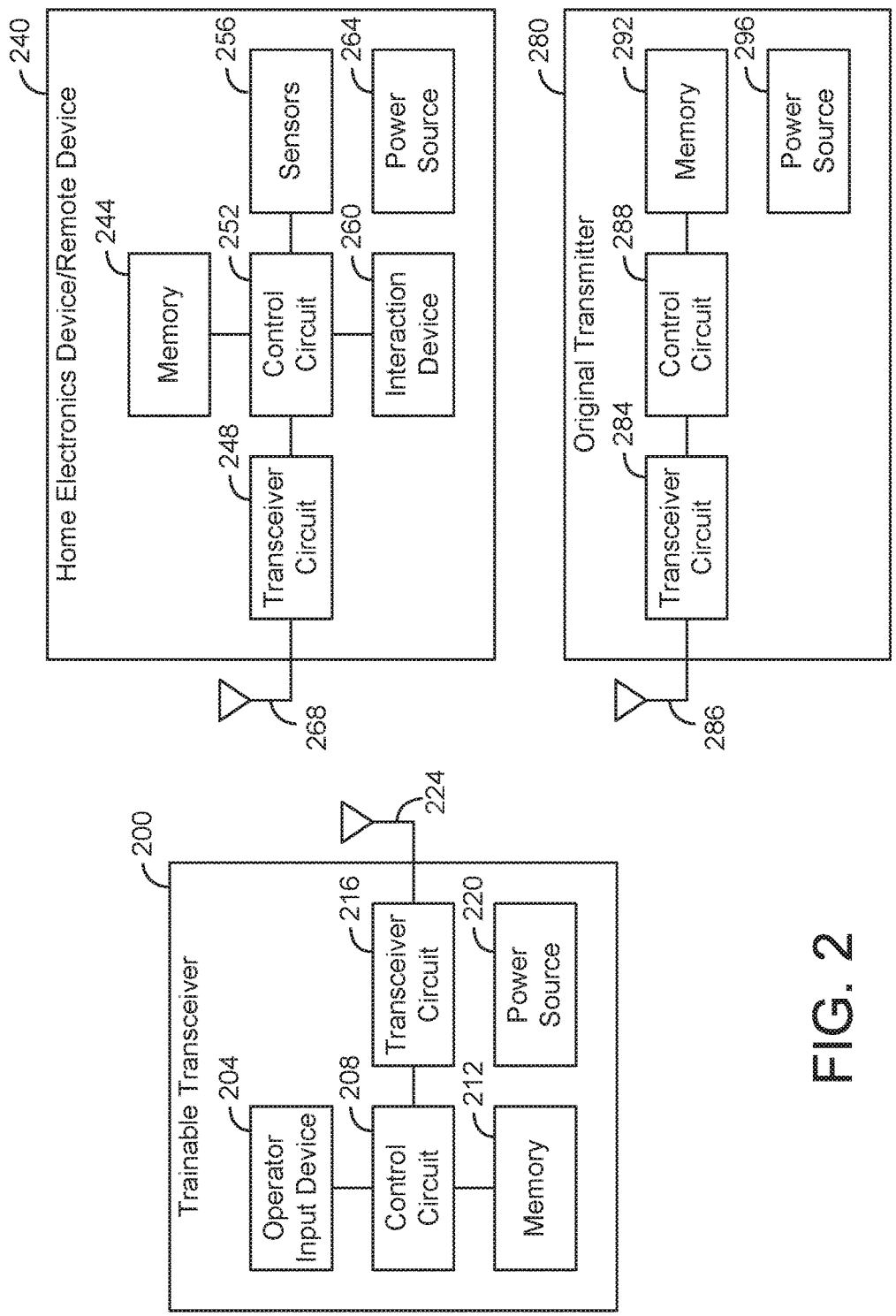
FIG. 2 illustrates a block diagram of a trainable transceiver, home electronics device, and original transmitter, according to an exemplary embodiment.

Referring now to FIG. 2, block diagrams of a trainable transceiver 200, home electronics device 240, and original transmitter 280 are illustrated according to one embodiment. The trainable transceiver 200 may include an operator input device 204, control circuit 208, memory 212, transceiver circuit 216, antenna 224, power source 220, and/or other components. The operator input device 204 is configured to receive user inputs and/or provide output to the user. In one embodiment, the operator input device 204 includes a series of buttons for receiving user input. In some embodiments, the operator input device 204 includes one or more light emitting diodes (LEDs) for providing output to the user. In further embodiments, the operator input device 204 includes one or more of switches, capacitive buttons, a touch screen display, liquid crystal display, microphone, speaker, and/or other input or output elements.

The control circuit 208 of the trainable transceiver 200 is configured to receive inputs from the operator input device 204. In response to inputs from the operator input device 204, the control circuit 208 may cause the transceiver circuit 216 to transmit an activation signal, control signal, and/or other signal. The control circuit 208 may use information in memory in order to cause the transceiver circuit 216 to format a signal for reception by a particular home electronics device 240 or remote device. For example, the memory 212 may include an identifier of the device, encryption information, frequencies for use in transmitting to the device, and/or other information.

The control circuit 208 may also receive inputs via the operator input device 204 and in response place the trainable transceiver 200 into a training mode. While in the training mode, an activation signal transmitted by the original transmitter 280 may be received by the transceiver circuit 216 of the trainable transceiver 200. The control circuit 208 of the trainable transceiver 200 may store one or more characteristics of the received activation signal in memory 212 for use in formatting control signals to be sent using the transceiver circuit 216. For example, stored characteristics may include, information identifying a home electronics device or remote device 240, encryption information, frequency, and/or other characteristics of the activation signal sent by the original transmitter 280 and received by the transceiver circuit 216 of the trainable transceiver 200. In some embodiments, the control circuit 208 may cause the operator input device 204 to provide an output (e.g., illuminate an LED) when the signal from the original transmitter 280 is received and one or more characteristics are stored in the memory 212.

The trainable transceiver 200 also includes a power source 220 in some embodiments. The control circuit 208 may control the power source 220 such that the antenna 224 and/or transceiver circuit 216 is provided with an amount of power determined based on the orientation of the trainable transceiver 200. In one embodiment, the power source 220 is or includes a vehicle power system. For example, the power source 220 may be a vehicle power system including a battery, alternator or generator, power regulating equipment, and/or other electrical power equipment. In further embodiments, the power source 220 may include components such as a battery, capacitor, solar cell, and/or other power generation or storage equipment.

Still referring to FIG. 2, the trainable transceiver 200 is configured to be trained to control a home electronics device and/or remote device 240. A home electronics device and/or remote device 240 may be any remotely controlled device. Examples of home electronics devices and/or remote devices 240 include garage door openers, lighting control systems, movable barrier systems (e.g., motorized gates, road barriers, etc.), multimedia systems, and/or other systems controllable by an activation signal and/or control signal. Home electronics devices and/or remote devices 20 may include an antenna 268 and a receiver or transceiver circuit 248 for receiving transmissions from the trainable transceiver 200 and/or an original transmitter 280. Home electronics devices and/or remote devices 240 may also include a control circuit 252 and/or memory 244 for processing the received signal. For example, an activation signal from a trainable transceiver 200 or original transmitter 280 may be received by an antenna 268 and receiver circuit. The control circuit 252 may determine if encryption information transmitted as part of the activation signal matches an expected value. The control circuit 252 may cause an interaction device to activate. For example, the home electronics devices and/or remote devices 240 may be a garage door opener and the interaction device may be a motor for opening and/or closing the garage door. Upon receipt of the activation signal at the transceiver or receiver circuit 248, the control circuit 252 may activate the motor after determining that the activation signal included valid encryption information such as a key value.

Home electronics devices and/or remote devices 240 may include a power source 264 for powering the interaction device and/or other components. For example, the power source 264 may be a connection to a home, office, or other structure's power system (e.g., one or more circuits drawing power from mains power). The power source 264 may be or include other components such as a battery.

In further embodiments, home electronics devices and/or remote devices 240 may include additional components such as sensors 256. Sensors 256 may be or include cameras, light sensors, motion sensors, garage door position sensors, and/or other sensors. Home electronics devices and/or remote devices 240 may use a transceiver circuit 284 to transmit information from or determined based on the sensors to the trainable transceiver 200. The trainable transceiver 200 may display this information using the operator input device 204.

Still referring to FIG. 2, home electronics devices and/or remote devices 240 may be sold with or otherwise be associated with an original transmitter 280. An original transmitter 280 may be a transmitter provided by the manufacturer of the home electronics devices and/or remote devices 240 for wirelessly controlling the home electronics devices and/or remote devices 240. In alternative embodiments, the original transmitter 280 may be a transmitter sold separately from the home electronics device and/or remote device 240 which is configured to control the home electronics device and/or remote device 240. For example, the original transmitter 280 may be a retrofit product, trainable transceiver 200, and/or other transmitter configured to control the home electronics device and/or remote device 240.

In some embodiments, the original transmitter 280 includes a transceiver circuit 284, control circuit 288, memory 292, power source 296, and/or other components. The transceiver circuit 284 may be a transceiver or transmitter and may be coupled to and/or include an antenna 286. The control circuit 288 may control the transceiver 284 to format and transmit an activation signal and/or control signal based on information stored in memory 292 (e.g., device identification information, encryption information, frequency, and/or other information). The control circuit 288 may also handle inputs received from an operator input device such as a button included in the original transmitter 280. The original transmitter 280 may have a power source 296 such as a battery.

Figure 3:
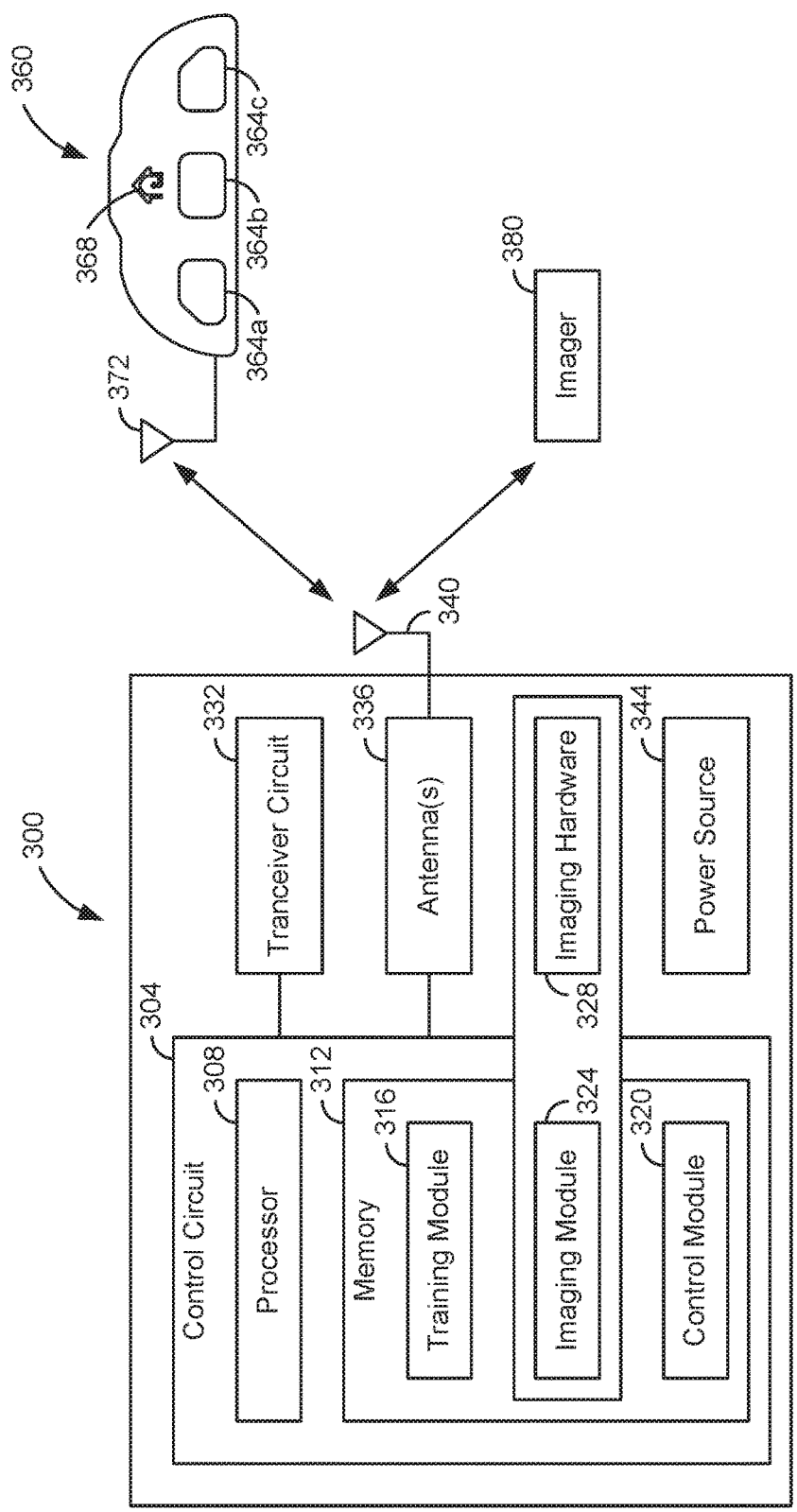
FIG. 3 illustrates a trainable transceiver, including a remote operator input device and imaging module, in communication with an imager according to an exemplary embodiment.

Referring now to FIG. 3, a block diagram of a trainable transceiver 300, an operator input device 360, and an imager 380 is illustrated according to one embodiment. A trainable transceiver 300 may include one or more of the components or features illustrated and described with reference to FIG. 3 and/or one or more of the components or features illustrated and described with reference to FIG. 2.

In one embodiment, the operator input device 360 includes a series of buttons 364a-c and an illuminable logo, design, light, or other feature. Each button may 364a-c be trained to operate a different home electronics device and/or remote device using one or more of the training procedures described herein. The illuminable feature of the operator input device 360 may be used to communicate information to the user of the trainable transceiver 300. The operator input device 360 may include a display 368, one or more LEDs, a speaker, and/or other output devices for providing an output to a vehicle occupant. The output may convey information to the vehicle occupant regarding the position of a vehicle (e.g., vehicle 100 shown in FIG. 1) within a garage, structure, and/or designated parking area.

The trainable transceiver 300 may include an operator input device 360 located remotely from one or more other components of the trainable transceiver 300 in some embodiments. For example, in embodiments in which the trainable transceiver 300 is installed in or otherwise integrated with a vehicle 100, the operator input device 360 may be located within the cabin of the vehicle 100, and one or more other components of the trainable transceiver 300 may be located in other locations (e.g., in an engine bay, in a trunk, behind or within a dashboard, in a headliner, elsewhere in the cabin and/or in other locations). This may allow for installation of the trainable transceiver 300, including the antenna, in a variety of locations and/or orientations. Advantageously, this may allow for the antenna(s) of the trainable transceiver 300 to be installed, mounted, or otherwise located in or on the vehicle 100 in a position with less interference from vehicle structural components. The operator input device 360 and other components of the trainable transceiver 300 maybe in unidirectional or bidirectional communication. The operator input device 360 communicates wirelessly with the remaining components of the trainable transceiver 300 in some embodiments. For example, the operator input device 360 may include a transceiver for transmitting signals corresponding to inputs received and for receiving status or other information to be conveyed to a vehicle occupant. The operator input device 360 may include a wireless transceiver (e.g., WiFi transceiver, Bluetooth transceiver, optical transceiver, and/or other transceiver) configured to communicate with the other components using the transceiver circuit and/or a second transceiver (e.g., WiFi transceiver, Bluetooth transceiver, optical transceiver, and/or other transceiver) located with the other components remote from the operator input device 360. Communication between the trainable transceiver 300 and the operator input device 360 may be carried out using one or more wireless communication protocols (e.g., a Bluetooth protocol, WiFi protocol, ZigBee protocol, or other protocol). The other components of the trainable transceiver 300 may communicate with the operator input device 360 using a transceiver circuit and/or a secondary or other transceiver (e.g., a Bluetooth transceiver).

In alternative embodiments, the operator input device 360 and the trainable transceiver 300 communicate using a wired connection. In further alternative embodiments, the trainable transceiver 300 does not include components located remotely from the operator input device 360. The components of the trainable transceiver 300 may be located in substantially the same location (e.g., housed within a single housing).

The trainable transceiver 300 includes a transceiver circuit 332 and/or one or more antennas 336, 340 included in or coupled to the transceiver circuit 332. The antenna(s) 336, 340 may be located in the same housing and/or same location as other components of the trainable transceiver 300 (e.g., the transceiver circuit 332, control circuit 304, operator input device 360, and/or other components). In alternative embodiments, the antenna(s) 336, 340 are located remotely from one or more components of the trainable transceiver 300. The antenna(s) 336, 340 may be coupled to other components of the trainable transceiver 300 (e.g., transceiver circuit 332, control circuit 304, power source 344, and/or other components) via a wired or wireless connection. For example, the antenna 340 and/or transceiver circuit 332 may be located remotely from the operator input device 360 and control circuit 304 with the control circuit 304 in wireless communication with the transceiver circuit 332 via the antenna 340 coupled to the transceiver circuit 332 and a second antenna 336 coupled to the control circuit 304. The antenna 336 and/or the antenna 340 may be one or a combination of a variety of antenna types. For example, the antenna 336 and/or the antenna 340 may be or include a dipole antenna, loop antenna, slot antenna, parabolic reflector, horn, monopole, helical, and/or other type of antenna. The antenna may be omnidirectional, weakly directional, or directional. The antenna(s) 336, 340 and/or transceiver circuit 332 may be used to retrieve image data from one or more sources. The antenna(s) 336, 340 and/or transceiver circuit 332 may further be used of controlling a home electronics device, remote device, or other device, such as the home electronics device and/or remote device 240 shown in FIG. 2 (e.g., by sending an activation signal formatted by the control circuit and/or transceiver circuit to control the device).

The control circuit 304 of the trainable transceiver 300 may include one or more modules in memory 312 for carrying out and/or facilitating the operation of the trainable transceiver 300 described herein. For example, the control circuit 304 may include a training module 316 in memory 312. The training module 316 may include instructions, programs, executable code, and/or other information which is used by the control circuit 304 to perform training functions. The modules of the control circuit 304 may be executed or otherwise handled or implemented using a processor 308. The processor 308 may be a general or application specific processor or circuit for performing calculations, handling inputs, generating outputs, and/or otherwise performing computational tasks. For example, when a specific input is received by the control circuit 304 (e.g., a button depressed for greater than 5 seconds), the training module 316 may include instructions for handling the input. The training module 316 may cause the control circuit 304 to use the transceiver circuit 332 to wait for the reception of a signal from an original transmitter (e.g., original transmitter 280 shown in FIG. 2). The training module may include instructions and/or programs for analyzing the received signal using one or more algorithms, look up tables, and/or other information structures/techniques. The training module 316 may also cause the storage of one or more characteristics of the received signal in memory 312.

In some embodiments, the memory 312 associated with the control circuit 304 includes an imaging module 324. The imaging module 324 is configured to receive images and/or image data and process this information to determine the position of the vehicle (e.g., vehicle 100 shown in FIG. 1) in the garage and/or whether the vehicle 100 is well-positioned in the garage. A variety of image processing techniques, computer vision techniques, and/or other techniques may be used to process the images and/or image data. Processing of information from one or more cameras may include digital imaging processing and/or digital signal analysis. This may include classification, feature extraction, pattern recognition, multi-scale signal analysis, reading a machine readable representation, and/or other use of algorithms and/or programs to process information from one or more cameras. The imaging module 324 may receive images and/or image data from one or more sources. In some embodiments, the images and/or image data is received from a remote imager 380 (e.g., a home electronics device connected to a camera or image sensors, a standalone camera, a remote device including a camera or image sensors, and/or other imager). The images and/or image data may be received via the transceiver circuit 332 of the trainable transceiver 300 and from a home electronics device (e.g., home electronics device 240 shown in FIG. 2). The images and/or image data may be received via a secondary transceiver circuit (e.g., a Bluetooth transceiver) and from a standalone camera (e.g., web enabled or smart camera). Images, image data, and/or other inputs received may include a frame buffer, bitmap, sensor data, image information, camera identification, and/or other information and/or data output from one or more cameras or other sensors. The imager(s) 380 (e.g., a home electronics device, standalone camera, remote device, or other device capable of acquiring images and/or image data) include digital camera, image sensor, light sensor, and/or other hardware for capturing or acquiring images and/or image data. For example, the imager 380 may include one or more of a charge-coupled devices sensor, complementary metal-oxide-semiconductor sensor, photodetector, and/or other imaging hardware.

The images and/or image data is analyzed (e.g., using the control circuit 304 and software of the imaging module 324 executed by the processor 308 of the control circuit 304) to determine the position of the vehicle 100 in the garage, the status of the vehicle 100, and/or whether the vehicle 100 is well-positioned in the garage. The position of the vehicle 100 and/or the status of the vehicle 100 (e.g., well positioned, nearing a position in which the vehicle 100 is well positioned, nearing collision with an object, needing further travel to be well positioned, needing to reverse to be well positioned, and/or other status) may be provided to another module (e.g., control module 320), used by the imaging module 324, used by the control circuit 304, and/or otherwise used as the basis for providing an output to the vehicle occupant which provides information regarding the positioning of the vehicle 100.

The imaging module 324 may include instructions, software, algorithms, and/or other information used to process images and/or image data received by the trainable transceiver 300. A variety of techniques may be used to determine the position of the vehicle 100, status of the vehicle 100, and/or whether the vehicle 100 is well positioned based on images and/or image data received. Techniques may include image processing techniques, computer vision techniques, machine vision techniques, and/or other techniques for processing and/or analyzing images and/or image data.

For example, the control circuit 304 and/or imaging module 324 in memory 312 may use image processing techniques such as pre-processing using one or more algorithms to prepare images and/or image data for further processing and/or analysis. Pre-processing may include re-sampling an image or image data, applying noise cancellation algorithms to compensate for image sensor noise, applying contrast enhancing algorithms to images and/or image data to enhance detectability of features included in the images, applying scaling algorithms to enhance image structures at appropriate scales or otherwise control the scale of the image, and/or otherwise apply an algorithm or other data handling technique which enhances the images and/or image data for further analysis and/or processing.

The control circuit 304 and/or imaging module 324 in memory 312 may use image processing techniques such as feature extraction using one or more algorithms to identify and/or extract one or more features included in the image and/or image data. Feature extraction may include using one or more algorithms to identify lines, edges, ridges, corners, blobs, points, textures, shapes, motion, and/or other features within the images and/or image data. Features may be extracted for further analysis such as the leading edge of a vehicle, a wall in front of the vehicle, the transition from a vehicle texture to a ground texture, the edge of an object in front of the vehicle, and/or other features. Identifying these and/or other features may allow for the imaging module 324 to determine the distance between features using one or more techniques and/or algorithms for determining distance in an image (e.g., pixel counting, image to image comparison, etc.). The control circuit 304 and/or imaging module 324 in memory 312 may use image processing techniques such as image detection/segmentation using one or more algorithms to determine which portions, image points, and/or regions of the image are relevant for further processing/analysis.

The control circuit 304 and/or imaging module 324 in memory 312 may use image processing techniques such as high-level processing algorithms or techniques to determine the vehicle position, vehicle status, and/or if the vehicle 100 is well positioned. For example, the imaging module 324 may apply an algorithm to the images and/or image data related to verification that the image data satisfies a model. For example, the imaging module 324 may create a model of a well-positioned vehicle 100 based on training of the imaging system (e.g., multiple images of vehicle 100 in well positioned locations stored in memory 312). The imaging module 324 may apply an algorithm for estimation of application specific parameters, such as object pose or object size. This may include applying an algorithm for estimating the speed of the vehicle 100, the direction of travel of the vehicle 100, the position of the vehicle 100 relative to the garage or structure wall, the position of the vehicle 100 relative to an object in the garage or structure, the position of the vehicle 100 relative to the position of a well-positioned vehicle 100 (e.g., the position of the a well-positioned vehicle 100 determined through training the imaging system), the distance between the vehicle 100 and a wall of the garage or structure, the distance between the vehicle 100 and an object, the distance between a vehicle 100 and the location of a well-positioned vehicle 100, and/or estimating other parameters/information. The imaging module 324 may apply an algorithm for image recognition such as classifying a detected object into one or more different categories or image registration such as comparing and combining two different views of the same object. For example, the imaging module 324 may apply an algorithm which classifies the vehicle 100 in the image as falling into one of a plurality of categories such as approaching a position in which the vehicle 100 is well positioned, well positioned, not well positioned, travelled past a position in which the vehicle 100 is well positioned, and/or other categories. The categories may correspond to vehicle statuses. The classification may be passed to other modules and/or otherwise used by the control circuit 304 to provide an output conveying information related to the category to a vehicle occupant.

In some embodiments, the imaging module 324 and/or control circuit 304 compares an image and/or image data corresponding to the current or near current position of the vehicle 100 to one or more images and/or image data corresponding to a well-positioned vehicle 100 to determine the position of the vehicle 100, vehicle status, and/or if the vehicle 100 is well positioned. The imaging module 324 may access images and/or image data stored in memory 312 corresponding to a well-positioned vehicle 100. These images and/or image data may be stored as part of a training process and/or stored automatically and/or periodically as the vehicle 100 is well positioned. The trainable transceiver 300 may determine (e.g., using the control circuit 304 and/or imaging module 324) if a match has been found or if no match has been found. For example, the trainable transceiver 300 may apply (e.g., using the control circuit 304) an algorithm or other program to determine if the two images match with a probability greater than a minimum threshold. If the current image and the stored image of a well-positioned vehicle 100 do not match, the trainable transceiver 300 may determine that the vehicle 100 is not well positioned. If the images match, the trainable transceiver 300 may determine that the vehicle is well positioned.

In some embodiments, the imaging module 324 and/or control circuit 304 uses a pixel counting algorithm to determine the distance between the vehicle 100 and a wall of the garage or structure to determine the position of the vehicle 100, vehicle status, and/or if the vehicle 100 is well positioned. For example, the imaging module 324 and/or control circuit 304 may analyze one or more images and/or image data corresponding with a well-positioned vehicle 100 in order to determine at what distance from a wall of the garage or structure the vehicle 100 is well positioned. The images and/or image data corresponding to a well-positioned vehicle 100 may be provided to the imaging module 324 and/or control circuit 304 as part of a training process. The control circuit 304 and/or imaging module 324 may analyze images and/or image data corresponding to the current or near current position of the vehicle 100 to determine the current position of the vehicle 100 based on its distance from the wall of the garage or structure. Based on the measured distances, the control circuit 304 and/or imaging module 324 may determine if the vehicle 100 is nearing a position in which it will be well positioned, is well positioned, or has traveled beyond a position in which the vehicle 100 is well positioned. In some embodiments, pixel counting may be used with multiple walls as reference points in order to determine if the vehicle 100 is well positioned in two dimensions.

Any one or more of the techniques described herein and/or other techniques may be used by the trainable transceiver 300 to determine the position of the vehicle 100, vehicle status, and/or if the vehicle 100 is well positioned based on images and/or image data from one or more cameras. Further techniques based on other sensor data may be used in addition to these techniques to determine vehicle position. The determined position of the vehicle 100, vehicle status, and/or if the vehicle 100 is well positioned may be further used to provide information to the vehicle occupant for assistance in parking or positioning the vehicle 100. In some embodiments, this any/or other information is provided to a control module 320 or other module of the control circuit 304 for use in conveying information to the vehicle occupant.

In some embodiments, the trainable transceiver 300 includes imaging hardware 328. The imaging hardware 328 may operate in conjunction with the imaging module 324 to carry out the analysis of images and/or image data using the one or more techniques described herein. The imaging hardware may be or include a graphics processing unit, graphics card, memory, processors, and/or other components which execute the algorithms, programs, instructions, functions, and/or other features stored in the imaging module 324. The imaging hardware 328 may be dedicated computing hardware (e.g., processors, memory, and/or other components) for processing images and/or image data received at the trainable transceiver 300 (e.g., from the imager 380). In alternative embodiments, the functions of the imaging hardware 328 are carried out by the control circuit 304 (e.g., one or more processors and memory included in the control circuit 304). In further embodiments, the imaging hardware 328 included in the trainable transceiver 300 includes hardware for capturing or acquiring images and/or image data (e.g., a charge-coupled devices sensor, complementary metal-oxide-semiconductor sensor, photodetector, and/or other imaging hardware).

The control circuit 304 may further include a control module 320. The control module 320 may include instructions, programs, executable code, and/or other information which is used by the control circuit 304 to control the operation of the trainable transceiver 300. For example, the control module 320 may be used to control an LED indicator or other output device included in the operator input device 360. The output device may be used to communicate information to a driver or passenger of the vehicle 100 such as the status of a home electronics device 240, remote device 240, and/or other device controlled by the trainable transceiver 300. For example, the control module 320 may cause the output device to display a color, image, illuminate a specific LED, or otherwise indicate a status such as a garage door is down.

In some embodiments, the control module 320 controls an output device used to assist a driver in parking the vehicle 100. The output device may be disposed in any of a variety of locations. For example, the output device may be disposed within the vehicle 100 (such as integrated with the trainable transceiver 300 or a vehicle component), it may be disposed remote from the vehicle 100 (such as being mounted on the garage wall or to the home electronics device 240), it may be located so as to project an image that is visible to the driver (such as a heads up display), or combinations thereof. The control module 320 may receive inputs from the imaging module 328 and/or otherwise be used by the control circuit 304 to control an output device for providing parking/positioning related information to a vehicle driver or occupant. The control module 312 and/or control circuit 304 may use information regarding the position of the vehicle 100 and/or the status of the vehicle 100 (e.g., well positioned, nearing a position in which the vehicle is well positioned, nearing collision with an object, needing further travel to be well positioned, needing to reverse to be well positioned, and/or other status) provided from another module (e.g., the imaging module 324) as the basis for providing an output to the vehicle occupant which provides information regarding the positioning of the vehicle 100 (e.g., by controlling one or more output devices included in the trainable transceiver 300). Providing information regarding the positioning of the vehicle 100 may include controlling an output device for illuminating an LED indicating that the vehicle 100 is well positioned. Providing information regarding the positioning of the vehicle 100 may include controlling an output device for illuminating a first LED that the vehicle 100 is nearing a position in which the vehicle 100 is well positioned, illuminating a second LED that the vehicle 100 is well positioned, and/or illuminating a third LED indicating that the vehicle 100 has travelled past a position of being well positioned. Providing information regarding the positioning of the vehicle 100 may include controlling an output device for illuminating an LED in one color to indicate that the vehicle 100 is nearing a position so as to be well positioned, illuminating the LED in a second color to indicate that the vehicle 100 is well positioned, illuminating the LED in a third color to indicate that the vehicle 100 has travelled past a position of being well positioned.

Providing information regarding the positioning of the vehicle 100 may include controlling an output device, using the control module 320 and/or control circuit 304, for producing an audible sound based on the vehicle position. For example, the control module 320 may cause a speaker to produce a solid tone when the vehicle 100 is well positioned. The control module 320 may control a speaker to produce a series of tones which increase in frequency as the vehicle 100 nears a position in which the vehicle 100 is well positioned. The control module 320 may control a speaker to produce a second tone with different audio qualities if the vehicle 100 travels past a position in which the vehicle 100 is well positioned. In further embodiments, the control circuit 304 may control a speaker to produce verbal instructions to the operator of a vehicle 100. For example, the control circuit 304, in response to information received from the imaging module 324 that the vehicle 100 is not yet well positioned, may control a speaker to produce a verbal message such as "continue pulling into the garage." The control circuit 304, in response to information received from the imaging module 324 that the vehicle 100 is well positioned, may control a speaker to produce a verbal message such as "stop, the vehicle 100 is positioned." The control circuit 304, in response to information received from the imaging module 324 that the vehicle has travelled past a position in which the vehicle 100 is well positioned, may control a speaker to produce a verbal message such as "stop and reverse the vehicle 100."

Providing information regarding the positioning of the vehicle 100 may include controlling an output device, using the control module 320 and/or control circuit 304, for producing an image or graphical representation of the position of the vehicle 100. For example, the control module 320 and/or control circuit 304 may control a display to output an image of the vehicle 100 in the garage or structure or in relation to a designated parking area. The image may be an image which is received from a camera directly or via a home electronics device 240 in communication with the camera and the trainable transceiver 300. The control circuit 304 may cause the output device to further superimpose an image over the image provided from the vehicle 100. The superimposed image may provide additional information such as remaining distance until the vehicle 100 is well positioned, an image of an outline within which the vehicle 100 will be well positioned, and/or other information. In other embodiments, the image produced by the output device in response to control by the control module 320 and/or control circuit 304 may be a graphical representation of the vehicle 100 in relationship to an area in which the vehicle 100 will be well positioned. This representation may be produced based on images and/or image data, a vehicle status, and/or other information provided to the control module 320 by the imaging module 324.

In further embodiments, the control module 320 and/or control circuit 304 controls a plurality of output devices using one or more of the techniques described herein and/or other techniques to convey information to an occupant of the vehicle 100. For example, audible indications of vehicle position and/or status may be used in conjunction with an LED light or display which visually conveys information regarding vehicle position and/or status.

The control module 320 may use one or more techniques to handle inputs provided by the imaging module 324 and/or otherwise received. For example, the control module 320 may use a lookup table of actions (e.g., control instructions for one or more output devices) corresponding to inputs received from the imaging module 324 (e.g., the position of the vehicle 100, a vehicle status, etc.). In alternative embodiments, the control module 320 may use one or more other techniques to handle inputs from the imaging module 324 to produce corresponding control instructions for one or more output devices. For example, the control module 320 may include one or more algorithms, functions, formulas, software, and/or other data handling/processing structures.

Figure 4:
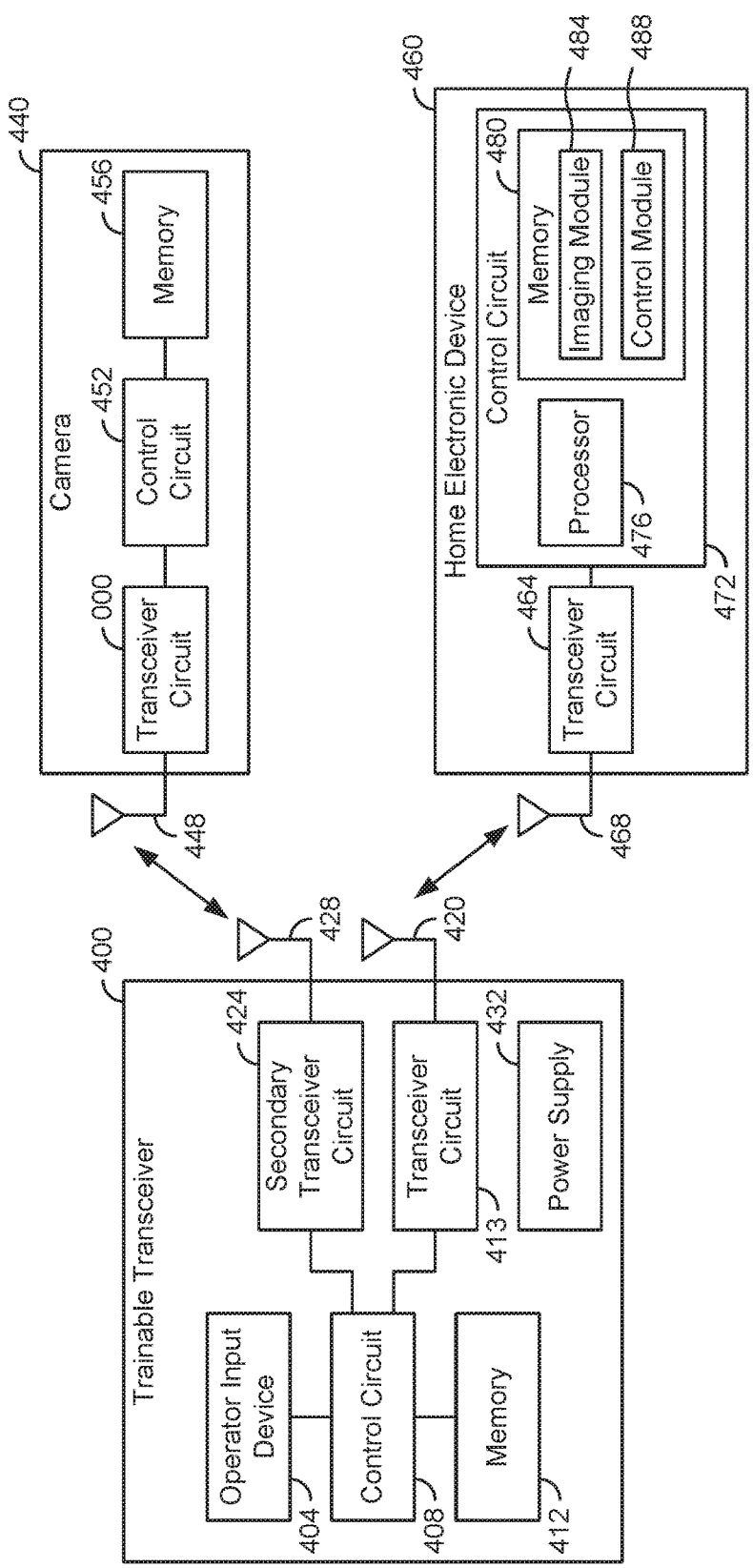
FIG. 4 illustrates a trainable transceiver which may be in communication with a standalone camera or a home electronics device in communication with a camera, according to an exemplary embodiment.

Referring now to FIG. 4, a trainable transceiver 400 is illustrated in relationship to a standalone camera 440 and home electronics device 460 in communication with a camera. In one embodiment, the trainable transceiver 400 is in communication with a standalone camera 440. In other embodiments, the trainable transceiver 400 is in communication with a home electronics device 460 including or in communication with a camera. The standalone camera 440 and/or home electronics device 460 (e.g., an imager) may be a source of images and/or image data for use by the trainable transceiver 400 in providing parking/positioning information to an occupant of a vehicle (e.g., vehicle 100 shown in FIG. 1). The standalone camera 440 and/or home electronics device 460 may further include a control circuit, imaging module, and/or imaging hardware. The standalone camera 440 and/or home electronics device 460 may perform the functions of the control circuit, imaging module, and/or imaging hardware for determining the position of the vehicle 100, vehicle status, and/or if the vehicle 100 is well positioned. In such a case, the standalone camera 440 and/or home electronics device 460 may provide the position of the vehicle 100, vehicle status, and/or an indication if the vehicle 100 is well positioned to the trainable transceiver 400. The trainable transceiver may convey this information and/or information based on the received information to an occupant of the vehicle 100 (e.g., using a control circuit, output device, and/or control module). In some embodiments, the trainable transceiver 400 does not include an imaging module and/or imaging hardware and/or otherwise does not receive or process images and/or image data.

In one embodiment, the trainable transceiver 400 is in bidirectional communication with a home electronics device 460. For example, the home electronics device 460 may be a garage door opener. The home electronics device 460 includes or is in communication (wired or wireless) with a camera. In some embodiments, the home electronics device 460 includes or is communication with only one camera. In alternative embodiments, multiple cameras may be used. The camera provides images and/or image data to the home electronics device 460. The home electronics device 460 provides images and/or image data to the trainable transceiver 400 using the bidirectional communication link. For example, the trainable transceiver 400 may include a transceiver circuit 416, which may be communicably coupled to or include an antenna 420, for sending activation signals to the home electronics device 460, receive status information from the home electronics device 460, and/or otherwise communicating with the home electronics device 460. The home electronics device 460 may include a transceiver circuit 464, which may be communicably coupled to or include an antenna 468, for receiving activation signals, providing status information, and/or otherwise communicating with the trainable transceiver 400. The transceiver circuit 464 may be used to provide images and/or image data from the home electronics device 460 to the trainable transceiver 400. In some embodiments, the trainable transceiver 400 requests images and/or image data from the home electronics device 460. The trainable transceiver 400 may request images and/or image data in response to transmitting an activation signal, establishing bidirectional communication with the home electronics device 460, and/or upon receiving a user input corresponding to providing parking/positioning assistance. For example, a user may press a button or otherwise provide an input via an operator input device 404 which corresponds to providing parking/positioning information and the trainable transceiver 400 may send a request for images and/or image data in response. In other embodiments, the home electronics device 460 transmits images and/or image data to the trainable transceiver 460 upon receiving an activation signal (e.g., for opening a garage door) and/or establishing bidirectional communication with the trainable transceiver 400. Using the images and/or image data received from the home electronics device 460, the trainable transceiver 400 may process and/or analyze the information using one or more of the techniques described herein to determine the position of the vehicle 100, vehicle status, and/or an indication if the vehicle 100 is well positioned. The trainable transceiver 400 may provide an output using one or more output devices which provides information related to the parking/positioning of the vehicle 100 (e.g., if the vehicle 100 is well positioned, if the vehicle 100 is nearing a position in which it will be well positioned, if the vehicle operator needs to reverse the vehicle 100, if the vehicle 100 is likely to collide with an object, and/or other information).

In an alternative embodiment, the home electronics device 460 uses the images and/or image data to process and/or analyze the information using one or more of the techniques described herein to determine the position of the vehicle 100, vehicle status, and/or an indication if the vehicle 100 is well positioned. The home electronics device 460 may provide this information to the trainable transceiver 400. The trainable transceiver 400 may then use this information to provide an output to the vehicle occupant for assisting in positioning the vehicle 100. In such a case, the home electronics device 400 may include a control circuit 408, processor, imaging module, and/or other components which perform the functions of the control circuit and imaging module as described with reference to FIG. 3 in order to determine the position of the vehicle 100, vehicle status, if the vehicle 100 is well positioned, and/or other information related to positioning the vehicle 100. Communication between the trainable transceiver 400 and the home electronics device 460, for images and/or image data, may be unidirectional with images and/or image data, or positioning information, communicated from the home electronics device 460 to the trainable transceiver 400.

In one embodiment, the trainable transceiver 400 is in bidirectional communication with a standalone camera 440. For example, the standalone camera 440 may be a web enabled camera, smart camera (e.g., a camera including both imaging hardware and image processing hardware and/or software), or other camera capable of wirelessly transmitting images and/or image data. In some embodiments, the trainable transceiver 400 is communication with only one standalone camera 440. In alternative embodiments, multiple cameras may be used. The standalone camera 440 provides images and/or image data to the trainable transceiver 400 using the bidirectional communication link. For example, the trainable transceiver 400 may include a secondary transceiver circuit 424, which may be communicably coupled to or include an antenna 428, for communicating with the standalone camera 440. The standalone camera 440 may include a transceiver circuit 444, which may be communicably coupled to or include an antenna 448, for communicating with the trainable transceiver 400 and/or other devices. The secondary transceiver circuit 424 and/or transceiver circuit 444 of the camera may be or include a Bluetooth transceiver, WiFi transceiver, ZigBee transceiver, cellular transceiver, and/or other transceiver for wireless communication. The secondary transceiver circuit 424 of the trainable transceiver 400 and the transceiver circuit 444 of the standalone camera 440 may be used to provide images and/or image data from the standalone camera 440 to the trainable transceiver 400. In some embodiments, the trainable transceiver 400 requests images and/or image data from the standalone camera 440. The trainable transceiver 400 may requests images and/or image data in response to transmitting an activation signal, establishing bidirectional communication with the standalone camera 440, and/or upon receiving a user input corresponding to providing parking/positioning assistance. For example, a user may press a button or otherwise provide an input via the operator input device 404 which corresponds to providing parking/positioning information and the trainable transceiver 400 may send a request for images and/or image data in response. In other embodiments, the standalone camera 440 transmits images and/or image data to the trainable transceiver 400 upon establishing bidirectional communication with the trainable transceiver 400. Using the images and/or image data received from the standalone camera 440, the trainable transceiver 400 may process and/or analyze the information using one or more of the techniques described herein to determine the position of the vehicle 100, vehicle status, and/or an indication if the vehicle 100 is well positioned. The trainable transceiver 400 may provide an output using one or more output devices which provides information related to the parking/positioning of the vehicle (100 e.g., if the vehicle 100 is well positioned, if the vehicle 100 is nearing a position in which it will be well positioned, if the vehicle operator needs to reverse the vehicle 100, if the vehicle 100 is likely to collide with an object, and/or other information).

In an alternative embodiment, the standalone camera 440 uses the images and/or image data to process and/or analyze the information using one or more of the techniques described herein to determine the position of the vehicle 100, vehicle status, and/or an indication if the vehicle 100 is well positioned. The standalone camera 440 may provide this information to the trainable transceiver 400. The trainable transceiver 400 may then use this information to provide an output to the vehicle occupant for assisting in positioning the vehicle 100. In such a case, the standalone camera 440 may include a control circuit 452, processor, memory 456, imaging module, and/or other components which perform the functions of the control circuit and imaging module as described with reference to FIG. 3 in order to determine the position of the vehicle 100, vehicle status, if the vehicle 100 is well positioned, and/or other information related to positioning the vehicle 100.

In further embodiments, the trainable transceiver 400 may use images and/or image data from both a home electronics device 460 and a standalone camera 440. In still further embodiments, the trainable transceiver 400 may acquire images and/or image data from one or more cameras included in or on the vehicle 100. The trainable transceiver 400 may process and/or analyze the images and/or image data from the one or more cameras in or on the vehicle 100. Alternatively, the trainable transceiver 400 may provide the images and/or image data from the one or more cameras in or on the vehicle 100 to the home electronics device 460 and/or standalone camera 440 for analysis and/or processing. In still further embodiments, additional sensors (e.g., range finders, anti-collision sensors, global positioning systems sensors, and/or other sensors) of the vehicle 100 may be used to provide information regarding the position of the vehicle 100. This information may be used by the trainable transceiver 400 and/or other devices for determining the vehicle status and/or if the vehicle 100 is well positioned.

In some embodiments, images and/or image data or information related to the position of the vehicle 100 (e.g., the position of the vehicle 100, vehicle status, an indicator if the vehicle 100 is well positioned, and/or other information related to positioning the vehicle 100) is transmitted from a standalone camera and/or home electronics device to a mobile phone (e.g., a smart phone) or other computing device (e.g., personal digital assistance, tablet, laptop computer, desktop computer, and/or other computing device). The mobile phone or other computing device may process this information using an application, program, or other software which implements one or more of the image processing techniques described herein. Alternatively, the mobile phone or other computing device may be provided with the position of the vehicle 100, vehicle status, an indicator if the vehicle 100 is well positioned, and/or other information related to positioning the vehicle 100. The mobile phone and/or other computing device may provide one or more of the outputs described herein with respect to the output device of the trainable transceiver 400. In some embodiments, the communication between the standalone camera 440 and/or home electronics device 460 and the mobile phone and/or other computing device is direct (e.g., using a Bluetooth transceiver, WiFi transceiver, cellular transceiver, and/or other transceiver). In alternative embodiments, the communication is routed through the trainable transceiver 400. For example, the trainable transceiver 400 may be in communication with the mobile phone and/or other computing device via a secondary transceiver 424 of the trainable transceiver 400.

Figures 5A, 5B:
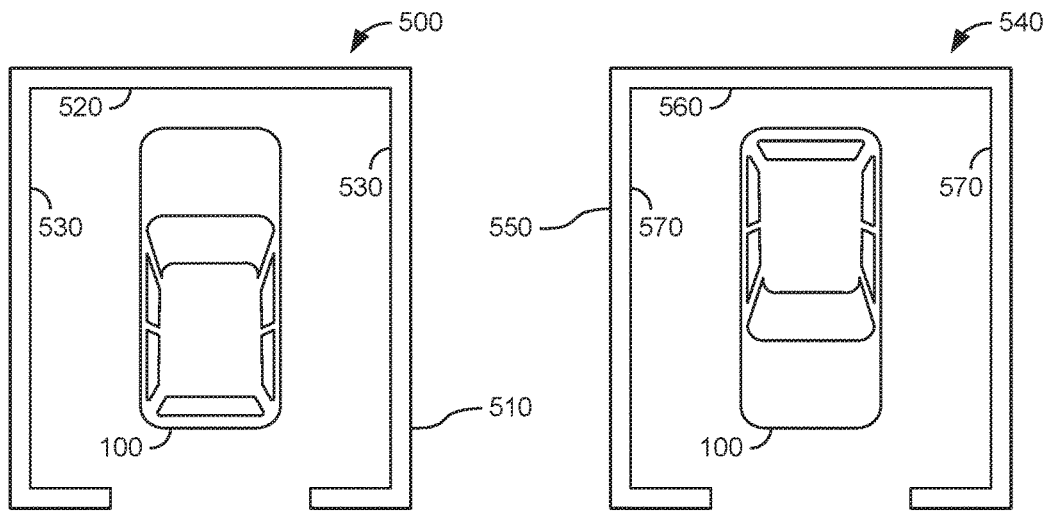
FIG. 5A illustrates an overhead image of a vehicle parked, forward facing in a garage, acquired by a camera, according to an exemplary embodiment.
FIG. 5B illustrates an overhead image of a vehicle parked, rear facing in a garage, acquired by a camera, according to an exemplary embodiment.

Referring now to FIGS. 5A and 5B, schematics 500, 540 of an image of a vehicle 100 in a garage is illustrated with the vehicle 100 pulling into the garage 510 and backing into the garage 550, respectively, according to one embodiment. The images and/or image data, used as described herein to provide a vehicle occupant with information about the position of the vehicle 100, may be provided using a camera with a top down view of a garage 100 or structure in which the vehicle 100 is being parked or otherwise positioned. The camera may be configured to provide an image of the vehicle 100 and all of the walls of the garage or structure. Alternatively, the camera may be configured to provide images of the vehicle 100 in relationship to a rear wall (e.g., rear wall 520 or rear wall 560) and/or side wall (e.g., side wall 530 or side wall 570) or rear wall only. It still further embodiments, the camera may be configured to provide images of the vehicle 100 without reference to any walls. The camera may be configured to provide images as described by mounting the camera in a specific location, adjusting the zoom of the camera, adjusting the lenses of the camera, adjusting a digital zoom of the camera, applying a cropping edit to all images produced by the camera, and/or using other techniques. The camera may be configured as a part of an installation of the camera, home electronics device, and/or training of the camera/positioning system described herein. Alternatively, the camera may produce an image with one or more of these characteristics without active configuration.

In embodiments in which a wall of the garage (e.g., garages 500, 540) or structure is visible in the images, pixel counting may be used to determine the location of the vehicle 100 relative to the wall and/or the distance between the vehicle 100 and the wall. Image comparison techniques may also or alternatively be used to determine the position of the vehicle 100, vehicle status, and/or if the vehicle 100 is well positioned.

Figures 6A, 6B:
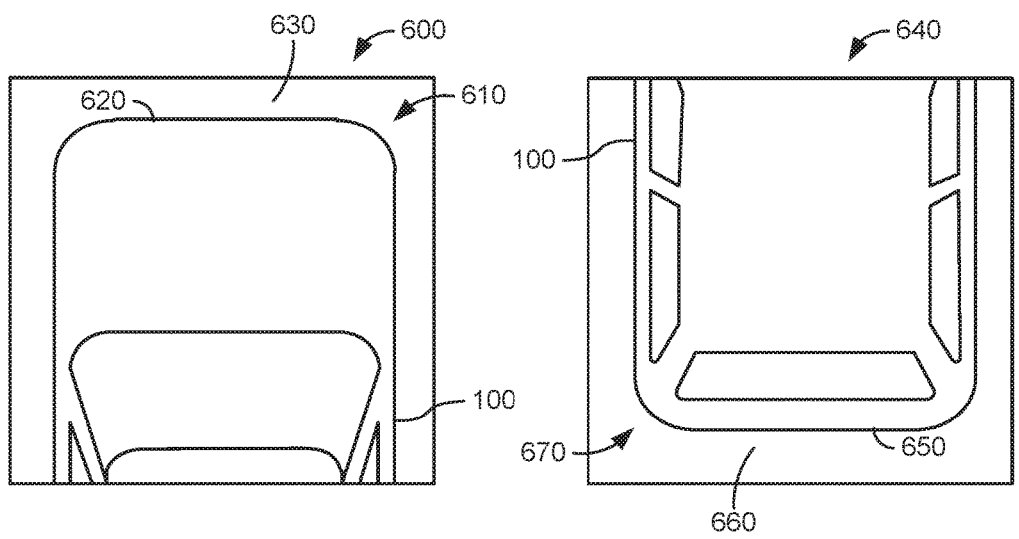
FIG. 6A illustrates an overhead image of a portion of a vehicle parked, forward facing in a garage, acquired by a camera, according to an exemplary embodiment.
FIG. 6B illustrates an overhead image of a portion of a vehicle parked, rear facing in a garage, acquired by a camera, according to an exemplary embodiment.

Referring now to FIGS. 6A and 6B, schematics 600, 640 of partial views of a front edge 620 or rear edge 650 of a vehicle 100 are illustrated, respectively. The images produced by one or more cameras and used for providing information regarding the position of the vehicle 100 may not include a complete view of the vehicle 100 when the vehicle 100 is well positioned and/or otherwise positioned. A partial view of the vehicle 100 may be used in conjunction with one or more of the techniques described herein to determine the position of the vehicle 100, vehicle status, and/or if the vehicle 100 is well positioned. For example, the imaging system may be trained and store images of front or rear portion of the vehicle 100 (e.g., front portion 610 including front edge 620 shown in FIG. 6A; rear portion 670 including rear edge 650 shown in FIG. 6B) corresponding to a well-positioned vehicle 100. The stored images of the well positioned portion of the vehicle 100 may be compared to current images of a portion of the vehicle 100 to determine if the vehicle 100 is well positioned, determine the position of the vehicle 100, and/or determine a status of the vehicle 100. In some embodiments, the imaging module of the trainable transceiver (e.g., imaging module 324 of trainable transceiver 300 shown in FIG. 3, etc.) and/or other device may identify the front or rear edge of the vehicle 100 as an area of high contrast in comparison to the garage or structure floor (e.g., comparing front edge 620 to floor 630 as shown in FIG. 6A; comparing rear edge 650 to floor 660 as shown in FIG. 6B). The location of the edge of the front or rear of the vehicle 100 may be used to determine if the vehicle 100 is well positioned, determine the position of the vehicle 100, and/or determine a status of the vehicle 100. In further embodiments, the imaging system may be trained automatically, store images of well positioned vehicles 100, store images corresponding to a variety of lighting conditions, and/or otherwise store images and/or image data automatically when the vehicle 100 is well positioned. The edge of the vehicle 100 (e.g., front edge 620, rear edge 650) may be identified in these stored images as a reference point for use in determining if the vehicle 100 is well positioned, determine the position of the vehicle 100, and/or determine a status of the vehicle 100. For example, the camera may be used to periodically acquire images of a stationary vehicle 100 in the garage or structure under the assumption that a stationary vehicle 100 is well positioned, the camera may acquire an image in response to an input from a user, the camera may acquire an image in response to determining that a vehicle 100 has stopped moving, and/or otherwise acquire images automatically or in response to user input for training the system. These images may be analyzed to determine the location of the edge (e.g., front edge 620 or rear edge 650) of the vehicle 100 for use in later determining if the vehicle 100 is well positioned, determining the position of the vehicle 100, and/or determining a status of the vehicle 100.

Referring now generally to FIGS. 3-8, the parking/positioning system described herein may be used in to detect and/or provide information for a single vehicle or multiple vehicles. A single camera may be used in a multicar garage to provide positioning information to two or more trainable transceivers located in different vehicles. The system may track multiple vehicle by assigning an identifier to each vehicle. For example, the identifier may be assigned based on image characteristics determine during a learning process (e.g., shape, color, size, and/or other characteristics of each vehicle). Alternatively, each vehicle may be identified based on an identifier (e.g., serial number) of the trainable transceiver associated with each vehicle. The system may know which comparison images to use, which of multiple parking spots to analyze, and/or otherwise how to determine vehicle position information in response to which identifier is received at the home electronics device. In alternative embodiments, the system may automatically adjust for multiple vehicles. For example, motion of a vehicle may be detected and stored images, distances, and/or other reference information used which corresponds to the nearest reference point to the moving vehicle (e.g., the nearest wall, the nearest identified position in which a vehicle is well positioned, etc.).

In some embodiments, an identifier of one or more vehicles and/or status information of one or more home electronics device may be transmitted to one or more trainable transceivers. For example, a home electronics device may use an identifier and/or status information to communicate to one vehicle that another vehicle is located in a garage or not located in the garage and/or that the garage door is closed or open. This information may be conveyed to a vehicle occupant using an output device. Advantageously, this may allow an occupant in one vehicle to know the status of another vehicle. Specific vehicles may be identified based on the vehicle identifier assigned to each vehicle.

Figure 7A:
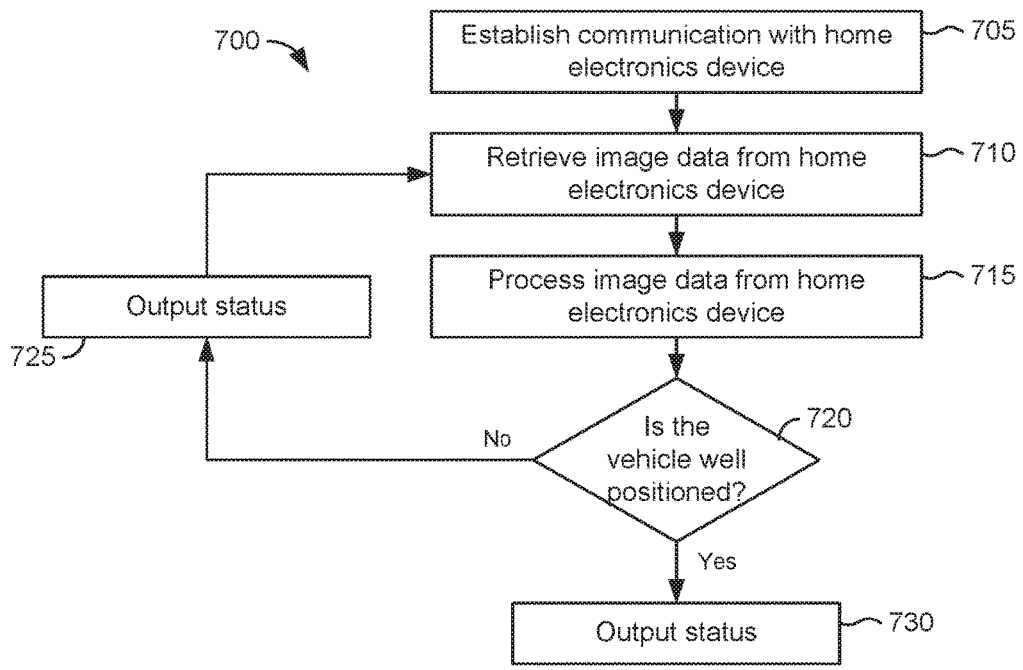
FIG. 7A illustrates a flow chart of a method for providing parking assistance using a camera and a trainable transceiver capable of image processing, according to one embodiment.
Figure 7B:
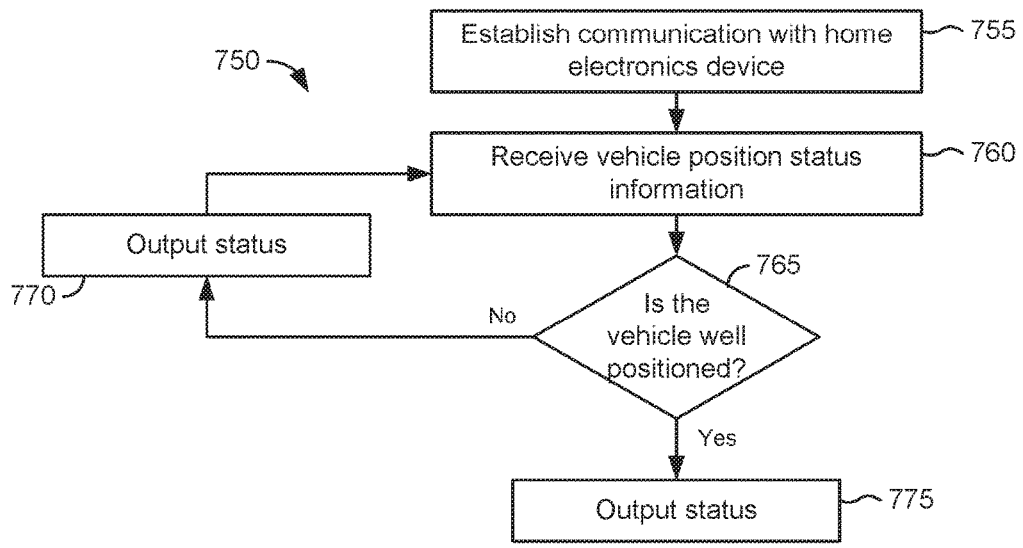
FIG. 7B illustrates a flow chart of a method for providing parking assistance using a camera and a trainable transceiver which receives a position status from a home electronics device, according to one embodiment.

Referring now to FIGS. 7A and 7B, flow charts 700, 750 illustrate a method of providing parking/positioning assistance to an occupant of a vehicle, according to various exemplary embodiments. The trainable transceiver may be used to provide outputs which provide information to an occupant of a vehicle (e.g., the operator the vehicle) regarding the position of the vehicle within a structure or garage. The outputs may provide information and/or instructions to the occupant of the vehicle which indicate or correspond to the vehicle being well positioned, the vehicle not being well positioned, the vehicle needing to continue into the garage, the vehicle needing to be reversed, vehicle otherwise needing to be moved in order to be well positioned and/or other states or instructions regarding the position of the vehicle.

Referring now to FIG. 7A, a flow chart 700 for a method of providing status outputs to a vehicle occupant corresponding to the position of the vehicle is illustrated according to one embodiment in which a trainable transceiver both provides the output and processes images to determine the position of the vehicle, vehicle status, and/or an indication if the vehicle is well positioned. At 705, the trainable transceiver may establish communication with a home electronics device or standalone camera. For example, the trainable transceiver may establish communication with a home electronics device when an activation signal is transmitted from the trainable transceiver to the home electronics device. Alternatively, communication may be established when the trainable transceiver enters communication range with the home electronics device or standalone camera.

Upon establishing communication with the home electronics device and/or standalone camera, at 710, the trainable transceiver may receive images and/or image data from the home electronics device and/or standalone camera. In some embodiments, the trainable transceiver requests the transmission of images and/or image data. In alternative embodiments, the home electronics device and/or standalone camera transmits the images and/or image data automatically upon establishing communication with the trainable transceiver. Transmission of images and/or image data may be stopped by instruction/control from the trainable transceiver and/or when communication from the trainable transceiver stops (e.g., the vehicle is turned off and the trainable transceiver no longer receives power for sending transmissions).

At 715, the trainable transceiver processes the image(s) and/or image data received from the home electronics device and/or standalone camera. The trainable transceiver may use a control circuit and/or imaging module in conjunction with one or more techniques describe herein and/or other techniques to process and/or analyze the images and/or image data. At 720, the trainable transceiver (e.g., using the control circuit and/or imaging module) may determine the position of the vehicle, vehicle status, and/or an if the vehicle is well positioned. The trainable transceiver (e.g., using the control circuit, imaging module, and/or control module) may determine if the vehicle is well positioned. For example, the position of the vehicle may be compared to the position of a vehicle which is well positioned and/or the distance of the vehicle from a reference point may be compared to the distance of a well-positioned vehicle from the reference point. Other techniques described herein and/or other techniques may be used in addition to or in place of these techniques to determine if the vehicle is well positioned.

If the vehicle is not well positioned, then at 725, the status of the vehicle is output to a vehicle occupant. For example, the trainable transceiver (e.g., using the control circuit and a control module) may control an output device such as a display, LED, speaker, and/or other output device to provide information to the vehicle occupant. The information conveyed to the vehicle occupant may be based on a determined status of the vehicle. For example, if the vehicle is approaching a position in which the vehicle will be well positioned, an LED may be controlled to illuminate in a blinking pattern. As the vehicle continues to approach the position in which the vehicle is well positioned, the frequency of the blinking may increase. Other information may be conveyed in response to other determined statuses. For example, the LED may be illuminated in a different color if the vehicle has travelled further into the garage and passed the position in which the vehicle is well positioned. As explained herein, other types of output may be used such as images, graphics, audible tones or messages, and/or other output.

After providing an output corresponding to the status of the vehicle, at 710, the trainable transceiver may receive an additional image(s) and/or image data from the home electronics device and/or standalone camera. These images and/or image data are processed and/or analyzed to determine information about the vehicle, and the trainable transceiver determines if the vehicle is well positioned. These steps may be iterative.

In response to determining that the vehicle is well positioned, then at 730, the trainable transceiver provides an output indicating this status to the vehicle occupant. The trainable transceiver may control (e.g., using the control circuit and/or the control module) an output device to convey information to the vehicle occupant that the vehicle is now well positioned. For example, an LED may be solidly illuminated and/or illuminated in a distinct color not otherwise used for conveying position information. Other techniques and/or output devices may be used to convey information to the occupant of the vehicle (e.g., displays, speakers, and/or other devices). The trainable transceiver may send an instruction to the home electronics device and/or standalone camera to cease transmitting images and/or image data. The trainable transceiver may cease requesting images and/or image data. The trainable transceiver may break communications with the home electronics device and/or standalone camera (e.g., in response to being turned off when the vehicle is shutdown).

Referring now to FIG. 7B, a flow chart 750 for a method of providing status outputs to a vehicle occupant corresponding to the position of the vehicle is illustrated according to one embodiment in which a trainable transceiver provides the output and another device processes images to determine the position of the vehicle, vehicle status, and/or an indication if the vehicle is well positioned.

At 755, the trainable transceiver may establish commination with a home electronics device and/or standalone camera. At 760, after establishing communication, the trainable transceiver receives vehicle position status information. For example, the trainable transceiver may receive information as to whether the vehicle is well positioned, not well positioned, approaching a position in which the vehicle will be well positioned, the vehicle has travelled past a position in which the vehicle is well positioned, and/or other statuses. The home electronics device and/or standalone camera may process images and/or image data using one or more of the techniques described herein and/or other techniques to determine the vehicle status. This status is then provided to the trainable transceiver using unidirectional or bidirectional communication with the trainable transceiver. In some embodiments, the home electronics device and/or standalone camera include a control circuit and/or imaging module for processing and/or analyzing images and/or image data. In some embodiments, the trainable transceiver does not include an imagining module and/or does not otherwise process or analyze images and/or image data.

At 765, If the vehicle status is not that the vehicle is well positioned, then at 770, the trainable transceiver may output information corresponding to a status other than well positioned. The trainable transceiver (e.g., using a control circuit and control module) may control one or more output devices to provide an indication of the vehicle status. For example, the trainable transceiver may cause an LED to illuminate in a specific color (e.g., yellow) indicating that the vehicle is approaching a position in which the vehicle is well positioned. The trainable transceiver may cause the LED to illuminate in a specific color (e.g., red) indicating that the vehicle has travelled past a position in which the vehicle is well positioned and/or that a collision with an object is imminent. The trainable transceiver may continue to (e.g., iteratively) receive vehicle position status information and output status information while the vehicle remains not well positioned.

At 765, If the vehicle status is that the vehicle is well positioned, then at 775, the trainable transceiver (e.g., using the control circuit and/or control module) controls an output device to display this information. For example, the trainable transceiver may cause an LED to illuminate in a specific color (e.g., green) indicating that the vehicle is well positioned. The trainable transceiver may cease receiving vehicle position status information from the home electronics device and/or standalone camera. For example, the trainable transceiver may transmit an instruction to cease transmitting images and/or image data and/or cease sending requests in the case that the trainable transceiver is in bidirectional communication with the home electronics device and/or standalone camera. In the case of unidirectional communication between the trainable transceiver and the home electronics device and/or standalone camera, the trainable transceiver may be turned off (e.g., due to the vehicle being turned off) and no longer receive transmissions. In some embodiments, the home electronics device and/or standalone camera may determine that the vehicle has remained well positioned for a predetermined amount of time and automatically cease transmitting to the trainable transceiver. In further embodiments, the trainable transceiver remains in communication with the home electronics device and/or standalone camera for a predetermined time after the vehicle is determined to be well positioned. Advantageously, this allows the trainable transceiver, home electronics device, and/or standalone camera to determine if the vehicle travels past a position in which it is well positioned (e.g., the vehicle has gone too far into the garage). In such a case, this information may be conveyed to the vehicle occupant using one or more output devices of the trainable transceiver.

Training of the Trainable Transceiver for Providing Position Information

Figure 8:
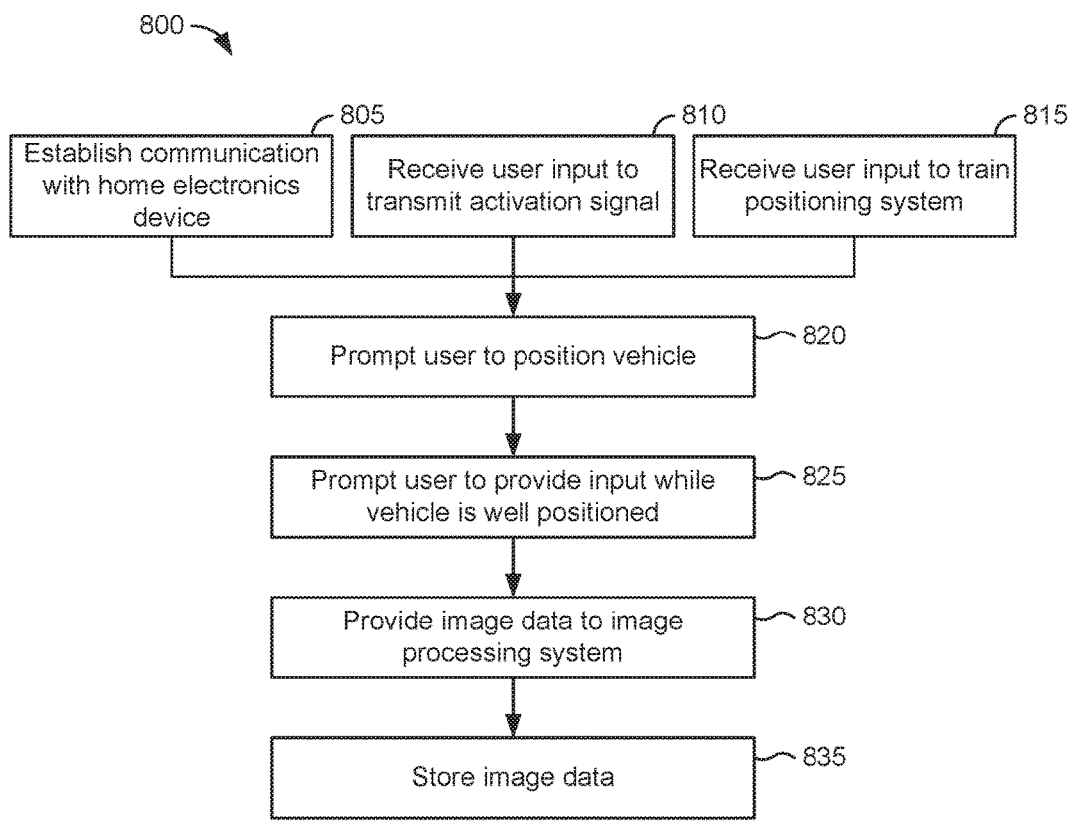
FIG. 8 illustrates a flow chart of a method for training a camera and trainable transceiver system for providing parking assistance, according to one embodiment.

Referring now to FIG. 8, a flowchart 800 of a method for training the image processing system for determining the position of a vehicle, status of a vehicle, and/or if the vehicle is well positioned is illustrated according to one embodiment. An image and/or image data of a current or near current position of a vehicle may be compared to one or more stored images and/or image data by the trainable transceiver, home electronics device, and/or standalone camera to determine the position of the vehicle, vehicle status, and/or an if the vehicle is well positioned. The stored images and/or image data may correspond to a well-positioned vehicle. The stored images and/or image data may be stored in memory of the trainable transceiver, memory of the home electronics device, memory of the standalone camera, and/or stored in other locations.

In some embodiments, the images and/or image data of a well-positioned vehicle are acquired by the imaging system as part of a training process. The training process may be initiated by one or more events or actions. In some embodiments, at 805, the training process is initiated when the trainable transceiver establishes communication with the home electronics device and/or the standalone camera. The training process may be initiated every time that communications are established. Alternatively, the training process may be initiated only in some instances in which communications are established. For example, the trainable transceiver, home electronics device, and/standalone camera may determine that no images and/or image data corresponding to a well-positioned vehicle are stored and/or that more images and/or image data should be acquired to improve accuracy of the system. The training process may also be initiated periodically.

In some embodiments, at 810 the training process may be initiated by a home electronics device and/or standalone camera when an activation signal is received from the trainable transceiver. For example, a garage door opener which receives an activation signal to open the garage may initiate the training process in response to receiving the activation signal. The training process may be initiated every time, periodically, and/or on the basis of the number of stored images and/or image data corresponding to a well-positioned vehicle.

In some embodiments, at 815, the training process may be initiated by a user input received at the trainable transceiver corresponding to training the parking/positioning system. For example, the user may provide an input via the operator input device such as depressing a button for a predetermined length of time.

Upon initiating the training process, at 820, the user is prompted to position the vehicle such that the vehicle is well positioned. For example, the user may be prompted to position the vehicle in a garage such that the vehicle is a desired distance from other objects. The prompt to the user may be visual (e.g., flashing an LED or illuminating an LED in a particular color), image based (e.g., displaying text on a display, displaying a video on a display), and/or audible (e.g., producing a tone or playing an audio message). In one embodiment, the prompt is output using an output device of the trainable transceiver. In other embodiments, the prompt may be output using a mobile phone and/or other computing device which is in communication with the trainable transceiver, home electronics device, and/or standalone camera.

At 825, the user may prompted to provide an input while the vehicle is well positioned. The prompt to the user may be visual (e.g., flashing an LED or illuminating an LED in a particular color), image based (e.g., displaying text on a display, displaying a video on a display), and/or audible (e.g., producing a tone or playing an audio message). In one embodiment, the prompt is output using an output device of the trainable transceiver. In other embodiments, the prompt may be output using a mobile phone and/or other computing device which is in communication with the trainable transceiver, home electronics device, and/or standalone camera. In one embodiment, the prompt is for the user to provide an input using the operator input device of the trainable transceiver when the vehicle is well positioned. For example, depressing a button of the trainable transceiver. In another embodiment, the prompt is for the user to flash the headlights of the vehicle on and off (e.g., flash on and off once, twice, three times, or any number of times). In some embodiments, the number of flashes does not affect the training process (e.g., one or more flashes works as a prompt).

The input provided by the user is received by the imaging system. In the case of a user input via the operator input device, the input is handled by the trainable transceiver (e.g., using a control circuit, training module, control module, and/or imaging module). In the case of a user input via flashing headlights, the input may be received using one or more cameras (e.g., a camera in communication with the home electronics device and/or a standalone camera). The flashing light may be registered by a control circuit and/or imaging module of the trainable transceiver, standalone camera, and/or home electronics device as an input corresponding to training. One or more of the image processing and/or analysis techniques described herein and/or other techniques may be used to process the input.

At 830, based on the input, image(s) and/or image data are provided to an image processing system. In one embodiment, the trainable transceiver requests an image(s) and/or image data from the home electronics device and/or standalone camera upon determining that the user input has been received. The trainable transceiver then stores the image(s) and/or image data in memory as image(s) and/or image data corresponding to a well-positioned vehicle. Alternatively, upon receiving the user input (e.g., flashing headlights), the home electronics device and/or standalone camera transmits image(s) and/or image data to the trainable transceiver for storage. In some alternative embodiments in which the trainable transceiver does not include an imaging module and/or otherwise does not process images, the home electronics device and/or standalone camera stores the image(s) and/or image data in memory as image(s) and/or image data of a well-positioned vehicle.

In some embodiments, the images and/or image data of a well-positioned vehicle are acquired by the imaging system automatically. This allows the imaging system and parking/positioning assistance system to learn and/or adapt automatically. The trainable transceiver, standalone camera, and/or home electronics device may cause an image to be stored based on a variety of occurrences. For example, triggers for the storage of comparison images may include when the trainable transceiver is turned off, when the vehicle engine is shut off, when movement of the vehicle is not detected for a predetermined amount of time, when communication between the trainable transceiver and home electronics device ceases, and/or when other events occur. In some embodiments, the system may be configured to store an image of a well-positioned vehicle periodically (e.g., after a vehicle is determined to be well positioned, multiple images under various lighting conditions may be stored prior to the vehicle moving again). In some embodiments, the trainable transceiver, standalone camera, and/or home electronics device determines when a vehicle has stopped moving (e.g., using a control circuit and/or imaging module). Upon determining that the vehicle is no longer moving and/or that the vehicle has not moved for a predetermined amount of time, an image(s) and/or image data of the vehicle is acquired and stored in memory as corresponding to a well-positioned vehicle. In one embodiment, the movement of the vehicle or lack thereof may be determined by identifying one or more pixels of an image corresponding to the vehicle (e.g., a point or leading edge) and tracking the pixel through the image as the vehicle moves. When the pixel is no longer moving through the image, it may be determined that the vehicle is no longer moving.

The system may be configured in a variety of ways to define whether a vehicle is well-positioned. For example, the system may identify a single optimal position of the vehicle and deem all vehicle locations within a tolerance factor to be well-positioned. As another example, the system may identify an outer boundary and deem all vehicle locations within the outer boundary to be well positioned. Other techniques could be used to define whether the vehicle is well-positioned.

In some embodiments, at 835, the system may store one or more images of the vehicle being positioned in the garage. The system may create a model of a well-positioned vehicle based on the stored one or more images. The model may identify overlapping portions of the vehicle across multiple images. The model may include a map (e.g., a heat map, a density map, etc.) in which regions having relatively greater overlap across the multiple images are associated with greater weight, and regions having relatively less overlap across the multiple images are associated with less weight. The system may associate a well-positioned vehicle with a vehicle positioned in a manner that corresponds with the overlap across multiple images.

In some embodiments, the model of a well-positioned vehicle includes a tolerance factor. The tolerance factor allows for acceptable deviations from a single well-positioned vehicle position. In some embodiments, the system includes a tolerance factor that is pre-defined within the system (e.g., a tolerance factor allow up to 5% deviation, 10% deviation, 20% deviation, etc., from a single well-positioned vehicle position). In some embodiments, the system sets the tolerance factor in response to user input. For example, during a process for training to learn the well-positioned vehicle position, the system may prompt a user to set the tolerance factor; the user may also set the tolerance factor separately from training. The tolerance factor may be relative (e.g., 5% deviation, 10% deviation, 20% deviation, etc., from a single well-positioned vehicle position). The tolerance factor may be absolute (e.g., one inch, three inches, six inches, one foot, etc.). The tolerance factor may account for an orientation of the vehicle, such as a certain angle of rotation (e.g., five degrees, ten degrees, twenty degrees, etc.) of the vehicle relative to a single well-positioned vehicle position, or a certain angle of rotation of the vehicle relative to a vehicle positioned such that an axis of the vehicle (e.g., a centerline axis, an axis that coincides with an axle of the vehicle, etc.) is perpendicular or parallel to a surface or wall of the garage. The system may process the images or imaging data to identify features of a well-positioned vehicle position, such as features associated with such tolerance factors, and store the features in memory. The system may update the well-positioned vehicle position and/or the features each time the vehicle is parked in the garage.

In some embodiments, the system performs a training process by applying a high tolerance to an initial set of vehicle park events and the associated images (e.g., the first five, ten, fifteen, etc., times that the vehicle is parked in the garage), then applying a low tolerance to subsequent vehicle park events and associated images. In this manner, the system undergoes a learning process during the initial set of vehicle park events to capture a broad scope of the features defining a well-positioned vehicle position. In some embodiments, the system may indicate to a vehicle occupant (e.g., by visual or audio outputs) that the system is applying a high tolerance during the initial set of vehicle park events. In some embodiments, if the system has previously received user input indicating that the vehicle has been well-positioned, then the system will apply a relatively low tolerance during any subsequent vehicle park event.

Further Embodiments of the Trainable Transceiver

The trainable transceiver as described herein may have various alternative configurations in alternative embodiments. Some alternative embodiments are described as follows. Referring again to FIG. 2, and in greater detail, an exemplary embodiment of a trainable transceiver 200 is illustrated along with an exemplary embodiment of a home electronics device/remote device 240 and an exemplary embodiment of an original transmitter 280. In one embodiment, the trainable transceiver 200 includes an operator input device 204. The operator input device 204 may be one or more buttons. For example, the operator input device 204 may be three hard key buttons. In some embodiments, the operator input device 204 may include input devices such as touchscreen displays, switches, microphones, knobs, touch sensor (e.g., projected capacitance sensor resistance based touch sensor, resistive touch sensor, or other touch sensor), proximity sensors (e.g., projected capacitance, infrared, ultrasound, or other proximity sensor), or other hardware configured to generate an input from a user action. In additional embodiments, the operator input device 204 may display data to a user or other provide outputs (e.g., using an output device). For example, the operator input device 204 may include a display screen (e.g., a display as part of a touchscreen, liquid crystal display, e-ink display, plasma display, light emitting diode (LED) display, or other display device), speaker, haptic feedback device (e.g., vibration motor), LEDs, or other hardware component for providing an output. In some embodiments, the operator input device 204 is connected to a control circuit 208. The control circuit 208 may send information and or control signals or instructions to the operator input device 204. For example, the control circuit 208 may send output instructions to the operator input device 204 causing the display of an image. The control circuit 208 may also receive input signals, instructions, and/or data from the operator input device 204.

The control circuit 208 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the control circuit may be a system on a chip (SoC) individually or with additional hardware components described herein. The control circuit 208 may further include, in some embodiments, memory (e.g., random access memory, read only memory, flash memory, hard disk storage, flash memory storage, solid state drive memory, etc.). In further embodiments, the control circuit 208 may function as a controller for one or more hardware components included in the trainable transceiver 200. For example, the control circuit 208 may function as a controller for a touchscreen display or other operator input device, a controller for a transceiver, transmitter, receiver, or other communication device (e.g., implement a Bluetooth communications protocol).

The control circuit 208 is coupled to memory 212. The memory 212 may be used to facilitate the functions of the trainable transceiver 200 described herein. Memory 212 may be volatile and/or non-volatile memory. For example, memory 212 may be random access memory, read only memory, flash memory, hard disk storage, flash memory storage, solid state drive memory, etc. In some embodiments, the control circuit 208 reads and writes to memory 212. Memory 212 may include computer code modules, data, computer instructions, or other information which may be executed by the control circuit 208 or otherwise facilitate the functions of the trainable transceiver 200 described herein. For example, memory 212 may include encryption codes, pairing information, identification information, a device registry, etc. Memory 212 may include computer instructions, codes, programs, functions, data sets, and/or other information which are used to implement the algorithms described herein.

The trainable transceiver 200 may further include a transceiver circuit 216 coupled to the control circuit 208. The transceiver circuit 216 allows the trainable transceiver 200 to transmit and/or receive wireless communication signals. Wireless communication signals may be or include activation signals, control signals, activation signal parameters, status information, notifications, diagnostic information, training information, instructions, and/or other information. The wireless communication signals may be transmitted to or received from a variety of wireless devices (e.g., an original transmitter 280, home electronic device 240, mobile communications device, and/or remote device 240). The transceiver circuit 216 may be controlled by the control circuit 208. For example, the control circuit 208 may turn on or off the transceiver circuit 216, the control circuit 208 may send data using the transceiver circuit 216, format information, an activation signal, control signal, and/or other signal or data for transmission via the transceiver circuit 216, or otherwise control the transceiver circuit 216. In some embodiments, the transceiver circuit 216 may include additional hardware such as processors, memory, integrated circuits, antennas (e.g., antenna 224), etc. The transceiver circuit 216 may process information prior to transmission or upon reception and prior to passing the information to the control circuit 208. In some embodiments, the transceiver circuit 216 may be coupled directly to memory 212 (e.g., to store encryption data, retrieve encryption data, etc.). In further embodiments, the transceiver circuit 216 may include one or more transceivers, transmitters, receivers, etc. For example, the transceiver circuit 216 may include an optical transceiver, near field communication (NFC) transceiver, etc. In some embodiments, the transceiver circuit 216 may be implemented as a system on a chip. The transceiver circuit 216 may be used to format and/or send activation signals to a device which cause the device to take an action and/or otherwise allows communication with the device. The activation signal may include activation signal parameters and/or other information. The transceiver circuit 216 may be or include a radio frequency transceiver (e.g., a transceiver which sends or receives wireless transmission using radio frequency electromagnetic radiation). For example, the transceiver circuit 216 and/or control circuit 208 may modulate radio waves to encode information onto radio frequency electromagnetic radiation produced by the transceiver circuit 216 and/or demodulate radio frequency electromagnetic radiation received by the transceiver circuit 216.

In some embodiments, the transceiver circuit 216 may include additional hardware such as one or more antennas, voltage controlled oscillator circuitry, amplifiers, filters, antenna tuning circuitry, volt meters, and/or other circuitry for the generation of and/or reception of modulated radio waves of different frequencies. The transceiver circuit 216 may provide for the functions described herein using techniques such as modulation, encoding of data onto a carrier wave, decoding data from a modulated carrier wave, signal strength detection, (e.g., computing and/or measuring voltage per length received by an antenna), antenna power regulation, and/or other functions related to the generation of and/or reception of radio waves. For example, the transceiver circuit 216 may be used to generate a carrier wave and encode onto the carrier wave (e.g., through modulation of the carrier wave such as frequency modulation or amplitude modulation) information such as control data, activation signal parameters, an encryption code (e.g., rolling code value), and/or other information. The transceiver circuit 216 may also be used to receive carrier waves and demodulate information contained within the carrier wave. The trainable transceiver 200 may be tuned (e.g., through antenna tuning) or otherwise controlled to send and/or receive radio waves (e.g., modulated carrier waves) at certain frequencies or channels and/or with a certain bandwidth.

The trainable transceiver 200 may communicate with original transmitters 280, home electronic devices 240, remote devices 240, mobile communications devices, network devices, and/or other devices as described above using the transceiver circuit 216 and/or other additional transceiver circuits or hardware. The devices with which the trainable transceiver 200 communicates may include transceivers, transmitters, and/or receivers. The communication may be one-way or two-way communication.

With continued reference to FIG. 2, a home electronics device or remote device 240 may include hardware components for communication with a trainable transceiver 200 or original transmitter 280. In some embodiments, the home electronics device or remote device 240 includes a transceiver circuit 248. The transceiver circuit 248 may be used to send and/or receive wireless transmissions. For example, the transceiver circuit 248 may be or include a transceiver which sends and/or receives radio frequency electromagnetic signals. The transceiver circuit 248 may allow a home electronics device or remote device 240 to receive an activation signal and/or other transmission from a trainable transceiver 200 or original transmitter 280. For example, a trainable transceiver 200 may transmit an activation signal using activation signal parameters acquired as part of a training process. The home electronics device or remote device 240 may receive the activation signal using a transceiver circuit 248. The transceiver circuit 248 may be configured to transmit signals to a trainable transceiver 200, original transmitter 280, and/or other device. For example, the home electronics device or remote device 240 may transmit status information (e.g., that a garage door is closed) or other information. In some embodiments, the trainable transceiver 200 is configured to send and/or receive signals using multiple channels (e.g., a plurality of frequencies of radio waves used for communication). The transceiver circuit 248 of the home electronics device or remote device 240 may function in the same or similar manner as described with reference to the transceiver circuit 248 of the trainable transceiver 200.

The home electronics device or remote device 240 includes memory 244 and/or a control circuit 252 in some embodiments. The memory 244 and/or control circuit 252 may facilitate and/or carry out the functions of the home electronics device or remote device 240 described herein. The control circuit 252 and/or memory 244 may be the same or similar to the control circuit 208 and/or memory 212 described with respect to the trainable transceiver 200. For example, the control circuit 252 may be or include a processor and the memory 244 may be or include volatile (e.g., flash memory) and/or non-volatile memory (e.g., hard disk storage). The control circuit 252 may carry out computer programs, instructions, and or otherwise use information stored in memory 244 to perform the functions of the home electronics device or remote device 240. For example, the control circuit 252 and memory 244 may be used to process an activation signal (e.g., perform encryption related tasks such as comparing a received key with a stored key, handling instructions included in the signal, executing instructions, processing information, and/or otherwise manipulating or handling a received signal) received by the transceiver circuit 248 and/or control an interaction device in response to the activation signal.

The home electronics device or remote device 240 may further include an interaction device. The interaction device may allow the home electronics device or remote device 240 to interact with another device, component, other hardware, the environment, and/or otherwise allow the home electronics device or remote device 240 to affect itself or something else. The interaction device may be an electrical device such as a light, transceiver, networking hardware. The interaction device may also or alternatively be an electromechanical device such as electric motor, solenoid, or other hardware. The home electronics device or remote device 240 (e.g., a garage door opener) may transmit a signal to a trainable transceiver 200 or original transmitter 280 from which the activation signal originated. The transmission may include information such as receipt of the activation signal, status information about the garage door opener or associated hardware (e.g., the garage door is closed), and/or other information.

In some embodiments, the home electronics device or remote device 240 include one or more sensors 256. Sensors 256 may be used by the device to monitor itself, the environment, hardware controlled by the device, and/or otherwise provide information to the device. Sensors 256 may provide status information to the device. For example, sensors 256 may be or include, temperature sensors (e.g., thermistor, thermocouple, or other hardware for measuring temperature), movement or acceleration sensors (e.g., accelerometers, inclinometers, or other sensors for measuring orientation, movement, or a derivative thereof), safety beams (e.g., sensors which detect when an infrared, or other spectrum, beam of light is broken by an object), sensor which detect distance (e.g., an ultrasound emitter and receiver configured to determine distance of an object), pressure sensors (e.g., pressure transducer, strain gauge, etc.), or other sensor. In some embodiments, one or more sensors 256 are configured to determine the status of a garage door opener or garage door. For example, a pressure sensor may be used to determine if a garage door is closed (e.g., in contact with the ground and/or sensor.

With continued reference to FIG. 2, components of an original transmitter 280 are illustrated according to an exemplary embodiment. The original transmitter 280 may include a transceiver circuit 284. As described with reference to the trainable transceiver 200, the transceiver circuit 284 of the original transmitter 280 may allow the original transmitter 280 to send transmissions to an associated device (e.g., home electronics device or remote device 240) and/or receive transmissions from an associated device. For example, an original transmitter 240 may send an activation signal to an associated device and/or may receive status information and or other information from the associated device.

The original transmitter 240 may include a control circuit 288 and/or memory 292. The control circuit 288 and/or memory 292 may facilitate the functions of the original transmitter 280 in the same or similar fashion as described with reference to the trainable transceiver 200. For example, the control circuit 288 may receive a user input from an operator input device (e.g., button). The control circuit 288 may cause the transceiver circuit 284 to transmit an activation signal in response. One or more activation signal parameters may be read by the control circuit 288 from memory 292. For example, the memory 292 of the original transmitter 280 may be non-volatile and store activation signal parameters for an associated device such as a frequency used to receive or send transmissions, frequencies used for the same, channels used for the same, encryption information (e.g., rolling code values, a seed value, etc.), device identification information, modulation scheme, and/or other information.

The transceiver circuit 216 of the trainable transceiver 200 and the transceiver circuit 284 of the home electronics device 240, remote device 240, original transmitter 280, and/or other device may be configured to communicate send and/or receive wireless signals (e.g., activation signals, communication signals, and/or other signals). This may allow for communication between the trainable transceiver 200 and other device. In one embodiment, the transceiver circuits are configured to transmit and/or receive radio frequency transmissions. Communication between the trainable transceiver 200 and other device may be unidirectional or bi-directional. In some embodiments, the trainable transceiver 200 and/or other device may be configured to communicate using multiple frequencies. Each frequency may be a channel used for communication. A home electronics device 240, remote device 240, original transmitter 280, or other device may be configured to communicate using multiple channels for sending and/or receiving radio frequency transmissions using a transceiver circuit. For example, a home electronics device 240 (e.g., garage door opener) may be configured to communicate using multiple channels in the 900 MHz band. Continuing the example, a first channel may be 903.925 MHz and a second channel may be 904.075 MHz. In some embodiments, a single channel is used for transmission and/or reception. In other embodiments, a plurality of channels (e.g., two or more channels) are used for communication by the home electronics device 240, remote device 240, original transmitter 280, and/or other device.

The trainable transceiver 200 may be trained to use the same plurality of channels or single channel thereby allowing the trainable transceiver 200 to communicate with the device. The trainable transceiver 200 may be trained (e.g., through a training procedure) to send and/or receive radio frequency transmissions using the channel(s) the device is configured to use for transmitting and/or receiving transmissions. The trainable transceiver 200 may store the channel information and/or other information as activation signal parameters for use with the corresponding device. The trainable transceiver 200 may store activation signal parameters (including channel frequencies used by the device) for one or more devices. Using the control circuit 208, memory 212, and/or transceiver circuit 216, the trainable transceiver 200 may format activation signals for a plurality of devices. This allows a single trainable transceiver 200 to control a plurality of devices depending on the user input. For example, a trainable transceiver 200 may receive a first user input and format a first activation signal for the device corresponding to a first device associated with the user input. The first activation signal may include or use a first channel or group of channels associated with the first device. This may allow the first device to communicate with the trainable transceiver using a plurality of channels. Continuing the example, a trainable transceiver 200 may receive a second user input and format a second activation signal for the device corresponding to a second device associated with the user input. The second activation signal may include or use a second channel or group of channels associated with the second device. This may allow the second device to communicate with the trainable transceiver 200 using a plurality of channels.

A trainable transceiver 200 may be trained to an existing original transmitter 280 such that the trainable transceiver 200 controls the device associated with the original transmitter 280. For example, a user may place the trainable transceiver 200 and original transmitter 280 such that the trainable transceiver 200 is within the transmission range of the original transmitter 280. The user may then cause the original transmitter 280 to send an activation signal or other transmission (e.g., by depressing a button on the original transmitter 280). The trainable transceiver 200 may identify one or more activation signal parameters, the device, and/or other information based on the transmission from the original transmitter 280 which the trainable transceiver 200 may receive using the transceiver circuit 216. The control circuit 208, memory 212, and/or other transceiver circuit may identify, determine, and or store information such as the frequency, frequencies, or channels used by the original transmitter 280 and therefore the device associated with the original transmitter 280, a control code or other encryption information, carrier frequency, bandwidth, and or other information.

In some embodiments, the home electronics device 240, remote device 240, or other device may be configured to learn an identifier, encryption information, and/or other information from a trainable transceiver 200. For example, the device may be placed in a learning mode during which time a user sends a transmission from the trainable transceiver 200 (e.g., by providing an input causing the transmission). The device may receive the transmission and perform a function in response. For example, the device may send an acknowledgement transmission in response to receiving the transmission, send a transmission including a ready indication (e.g., that the device is synchronized with the trainable transceiver, encryption information has been exchanged, communication has been acknowledged on all channels used by the device, etc.), store an identifier of the trainable transceiver 200, and/or perform other functions. This may process may constitute a pairing of the trainable transceiver 200 and the home electronics device 240, remote device 240, or other device. For systems using a rolling code, the trainable transceiver 200 and device may be synchronized so that the counters of the trainable transceiver and the device begin with the same rolling code value.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A trainable transceiver for controlling a device and providing vehicle position information to a vehicle occupant, comprising:
    a transceiver circuit;
    an output device; and
    a control circuit coupled to the transceiver circuit and the output device, the control circuit configured to:
        receive, using the transceiver circuit or a secondary transceiver, first image data corresponding to a position of the vehicle,
        determine a vehicle position status by comparing the first image data corresponding to the position of the vehicle to second image data corresponding to a predetermined vehicle position status category, and
        control the output device to convey information to the vehicle occupant based on the vehicle position status;
        receive a user input for entering a training mode;

prompt the user to position the vehicle in response to the user input;
prompt the user to provide an input when the vehicle is well positioned; and
store the second image data corresponding to a well-positioned vehicle in response to receiving the input when the vehicle is well positioned.

2. The trainable transceiver of claim 1, wherein the control circuit is configured to determine the vehicle position status by analyzing the first image data corresponding to the position of the vehicle and received using the transceiver circuit or secondary transceiver to determine the distance between the vehicle and a reference point.

3. The trainable transceiver of claim 1, wherein the vehicle position status includes at least one of well-positioned within the structure, not well positioned within the structure, approaching a position in which the vehicle will be well positioned, or travelled past a position in which the vehicle is well positioned, the second image data stored in memory of the trainable transceiver.

4. A trainable transceiver for controlling a device and providing vehicle position information to a vehicle occupant, comprising:
a transceiver circuit;
an output device; and
a control circuit coupled to the transceiver circuit and the output device configured to:
receive, using the transceiver circuit or a secondary transceiver, a vehicle position status for a vehicle having a remote device, the vehicle position status determined by the remote device by comparing first image data corresponding to a position of the vehicle to second image data corresponding to a predetermined vehicle position status category, the second image data stored in memory of the remote device, and
control the output device to convey information to the vehicle occupant based on the vehicle position status;
wherein the control circuit is further configured to:
receive a user input for entering a training mode,
prompt the user to position the vehicle in response to the user input,
prompt the user to provide an input when the vehicle is well positioned, and
cause the remote device to store the second image data corresponding to a well-positioned vehicle in response to receiving the input when the vehicle is well positioned.

5. The trainable transceiver of claim 4, wherein the remote device is configured to determine the vehicle position status by analyzing the first image data corresponding to the position of the vehicle to determine the distance between the vehicle and a reference point.

6. The trainable transceiver of claim 4, wherein the vehicle position status includes at least one of well-positioned, not-well positioned, approaching a position in which the vehicle will be well positioned, or travelled past a position in which the vehicle is well positioned, the second image data stored in memory of the remote device.

7. A method of providing vehicle position information to a vehicle occupant using a trainable transceiver, comprising:
receiving, at an operator input device of the trainable transceiver a user input for entering a training mode;
prompting, using the output device, the user to position the vehicle in response to the user input;
prompting, using the output device, the user to provide an input when the vehicle is well positioned;
storing a second image data corresponding to a well-positioned vehicle in response to receiving the input when the vehicle is well positioned;
establishing, using a transceiver circuit or a secondary transceiver of the trainable transceiver, communication between the trainable transceiver and a remote device;
receiving first image data, at the trainable transceiver, wherein the first image data corresponds to a position of the vehicle;
determining, using a control circuit of the trainable transceiver, a vehicle position status by comparing the first image data corresponding to the position of the vehicle to the second image data corresponding to a predetermined vehicle position status category; and
providing, using an output device of the trainable transceiver, vehicle position information based on the determined vehicle position status.

8. The method of claim 7, further comprising analyzing, using the control circuit, the first image data corresponding to the position of the vehicle to determine the distance between the vehicle and a reference point.

9. The method of claim 7, wherein the vehicle position status includes at least one of well-positioned, approaching a position in which the vehicle will be well positioned, or travelled past a position in which the vehicle is well positioned, the second image data stored in memory of the trainable transceiver.

10. A method of providing vehicle position information to a vehicle occupant using a trainable transceiver, comprising:
receiving, at an operator input device of the trainable transceiver a user input for entering a training mode;
prompting, using the output device, the user to position the vehicle in response to the user input;
prompting, using the output device, the user to provide an input when the vehicle is well positioned; and
storing a second image data in memory of the remote device corresponding to a well-positioned vehicle in response to receiving the input when the vehicle is well positioned;
establishing, using a transceiver circuit or a secondary transceiver of the trainable transceiver, communication between the trainable transceiver and a remote device;
receiving first image data, at the remote device, wherein the first image data corresponds to a position of the vehicle;
determining, using the remote device, a vehicle position status by comparing the first image data corresponding to the position of the vehicle to the second image data corresponding to a predetermined vehicle position status category;
receiving, using the transceiver circuit or the secondary transceiver of the trainable transceiver, the vehicle position status from the remote device; and
providing, using an output device of the trainable transceiver, vehicle position information based on the received vehicle position status.

11. The method of claim 10, further comprising analyzing, using the remote device, the first image data corresponding to the position of the vehicle to determine the distance between the vehicle and a reference point.

12. The method of claim 10, wherein the vehicle position status is at least one of well positioned, not well positioned, approaching a position in which the vehicle will be well positioned, or travelled past a position in which the vehicle is well positioned.

\* \* \* \* \*